US012719595B2

(12) United States Patent
Zhang et al.

(10) Patent No.: US 12,719,595 B2
(45) Date of Patent: Aug. 25, 2026

(54) DOWNLINK MUTING FOR INTER-USER-EQUIPMENT CROSS LINK INTERFERENCE MEASUREMENTS

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Peter Gaal, San Diego, CA (US)

( * ) Notice: Subject to any disclaimer, the term of this patent is extended or adjusted under 35 U.S.C. 154(b) by 281 days.

(21) Appl. No.: 18/657,480

(22) Filed: May 7, 2024

(65) Prior Publication Data

US 2025/0350384 A1 Nov. 13, 2025

(51) Int. Cl.
*H04B 17/345* (2015.01)
*H04W 24/10* (2009.01)

(52) U.S. Cl.
CPC .......... *H04B 17/345* (2015.01); *H04W 24/10* (2013.01)

(58) Field of Classification Search
CPC .... H04B 17/345; H04W 24/10; H04L 5/0048; H04L 5/0062; H04L 5/0094; H04L 5/14; H04L 5/0053
See application file for complete search history.

(56) References Cited

U.S. PATENT DOCUMENTS

2020/0389805 A1* 12/2020 Kim ...................... H04W 72/23
2021/0250797 A1* 8/2021 Karjalainen .......... H04W 24/10
2024/0267261 A1* 8/2024 Peralta Calvo ....... H04L 5/0073
2025/0226898 A1* 7/2025 Xiong ................... H04L 27/261
2025/0317225 A1* 10/2025 Zhang ................... H04W 24/08

FOREIGN PATENT DOCUMENTS

WO WO-2020190263 A1 * 9/2020 ............ H04W 72/27
WO 2023212080 A1 11/2023

OTHER PUBLICATIONS

International Search Report and Written Opinion—PCT/US2025/024072—ISA/EPO—Jun. 25, 2025.

Wilus Inc: "Discussion on CLI Handling for Evolution of NR Duplex Operation", 3GPP TSG RAN WG1 #116, R1-2401216, vol. RAN WG1, No. Athens, GR, Feb. 26, 2024-Mar. 1, 2024, Feb. 19, 2024, 7 Pages, XP052568985, Sections 1-3.

* cited by examiner

*Primary Examiner* — Austin J Moreau

(57) ABSTRACT

Various aspects of the present disclosure generally relate to wireless communication. In some aspects, a user equipment (UE) may receive, from a network node, configuration information indicating one or more UE-to-UE cross link interference (CLI) measurement resources, within at least one downlink sub-band in one or more sub-band full-duplex (SBFD) symbols, and indicating a resource element (RE)-level or resource block (RB)-level downlink muting pattern associated with the one or more UE-to-UE CLI measurement resources. The UE may perform one or more UE-to-UE CLI measurements in the one or more UE-to-UE CLI measurement resources. The UE may transmit, to the network node, a measurement report including results of the one or more UE-to-UE CLI measurements. Numerous other aspects are described.

20 Claims, 17 Drawing Sheets

900

1200

1400

DOWNLINK MUTING FOR INTER-USER-EQUIPMENT CROSS LINK INTERFERENCE MEASUREMENTS

FIELD OF THE DISCLOSURE

Aspects of the present disclosure generally relate to wireless communication and specifically relate to techniques, apparatuses, and methods for downlink muting for inter-user-equipment cross link interference measurements.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a user equipment (UE) for wireless communication. The UE may include one or more memories and one or more processors coupled to the one or more memories. The one or more processors may be configured to cause the UE to receive, from a network node, configuration information indicating one or more UE-to-UE cross link interference (CLI) measurement resources, within at least one downlink sub-band in one or more sub-band full-duplex (SBFD) symbols, and indicating a resource element (RE)-level or resource block (RB)-level downlink muting pattern associated with the one or more UE-to-UE CLI measurement resources. The one or more processors may be configured to cause the UE to perform one or more UE-to-UE CLI measurements in the one or more UE-to-UE CLI measurement resources. The one or more processors may be configured to cause the UE to transmit, to the network node, a measurement report including results of the one or more UE-to-UE CLI measurements.

Some aspects described herein relate to a network node for wireless communication. The network node may include one or more memories and one or more processors coupled to the one or more memories. The one or more processors may be configured to cause the network node to transmit, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The one or more processors may be configured to cause the network node to receive, from the UE, a measurement report including results of one or more UE-to-UE CLI measurements associated with the one or more UE-to-UE CLI measurement resources.

Some aspects described herein relate to a UE for wireless communication. The UE may include one or more memories and one or more processors coupled to the one or more memories. The one or more processors may be configured to cause the UE to receive, from a network node, configuration information indicating one or more UE-to-UE CLI measurement resources in one or more symbols. The one or more processors may be configured to cause the UE to perform one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols. The one or more processors may be configured to cause the UE to transmit, to the network node, a measurement report including results of the one or more UE-to-UE CLI measurements.

Some aspects described herein relate to a network node for wireless communication. The network node may include one or more memories and one or more processors coupled to the one or more memories. The one or more processors may be configured to cause the network node to transmit, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols. The one or more processors may be configured to cause the network node to receive, from the UE, a measurement report including results of the one or more UE-to-UE CLI measurements.

Some aspects described herein relate to a method of wireless communication performed by a UE. The method may include receiving, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The method may include performing one or more UE-to-UE CLI measurements in the one or more UE-to-UE CLI measurement resources. The method may include transmitting, to the network node, a measurement report including results of the one or more UE-to-UE CLI measurements.

Some aspects described herein relate to a method of wireless communication performed by a network node. The method may include transmitting, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The method may include receiving, from the UE, a measurement report including results of one or more UE-to-UE CLI measurements associated with the one or more UE-to-UE CLI measurement resources.

Some aspects described herein relate to a method of wireless communication performed by a UE. The method may include receiving, from a network node, configuration information indicating one or more UE-to-UE CLI measurement resources in one or more symbols. The method may include performing one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols. The method may include transmitting, to the network node, a measurement report including results of the one or more UE-to-UE CLI measurements.

Some aspects described herein relate to a method of wireless communication performed by a network node. The method may include transmitting, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols. The method may include receiving, from the UE, a measurement report including results of the one or more UE-to-UE CLI measurements.

Some aspects described herein relate to a non-transitory computer-readable medium that stores a set of instructions for wireless communication by a UE. The set of instructions, when executed by one or more processors of the UE, may cause the UE to receive, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The set of instructions, when executed by one or more processors of the UE, may cause the UE to perform one or more UE-to-UE CLI measurements in the one or more UE-to-UE CLI measurement resources. The set of instructions, when executed by one or more processors of the UE, may cause the UE to transmit, to the network node, a measurement report including results of the one or more UE-to-UE CLI measurements.

Some aspects described herein relate to a non-transitory computer-readable medium that stores a set of instructions for wireless communication by a network node. The set of instructions, when executed by one or more processors of the network node, may cause the network node to transmit, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The set of instructions, when executed by one or more processors of the network node, may cause the network node to receive, from the UE, a measurement report including results of one or more UE-to-UE CLI measurements associated with the one or more UE-to-UE CLI measurement resources.

Some aspects described herein relate to a non-transitory computer-readable medium that stores a set of instructions for wireless communication by a one or more instructions that, when executed by one or more processors of a UE. The set of instructions, when executed by one or more processors of the UE, may cause the UE to receive, from a network node, configuration information indicating one or more UE-to-UE CLI measurement resources in one or more symbols. The set of instructions, when executed by one or more processors of the UE, may cause the UE to perform one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols. The set of instructions, when executed by one or more processors of the UE, may cause UE to transmit, to the network node, a measurement report including results of the one or more UE-to-UE CLI measurements.

Some aspects described herein relate to a non-transitory computer-readable medium that stores a set of instructions for wireless communication by a network node. The set of instructions, when executed by one or more processors of the network node, may cause the network node to transmit, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols. The set of instructions, when executed by one or more processors of the network node, may cause the network node to receive, from the UE, a measurement report including results of the one or more UE-to-UE CLI measurements.

Some aspects described herein relate to an apparatus for wireless communication. The apparatus may include means for receiving, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The apparatus may include means for performing one or more UE-to-UE CLI measurements in the one or more UE-to-UE CLI measurement resources. The apparatus may include means for transmitting, to the network node, a measurement report including results of the one or more UE-to-UE CLI measurements.

Some aspects described herein relate to an apparatus for wireless communication. The apparatus may include means for transmitting, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The apparatus may include means for receiving, from the UE, a measurement report including results of one or more UE-to-UE CLI measurements associated with the one or more UE-to-UE CLI measurement resources.

Some aspects described herein relate to an apparatus for wireless communication. The apparatus may include means for receiving, from a network node, configuration information indicating one or more UE-to-UE CLI measurement resources in one or more symbols. The apparatus may include means for performing one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols. The apparatus may include means for transmitting, to the network node, a measurement report including results of the one or more UE-to-UE CLI measurements.

Some aspects described herein relate to an apparatus for wireless communication. The apparatus may include means for transmitting, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols. The apparatus may include means for receiving, from the UE, a measurement report including results of the one or more UE-to-UE CLI measurements.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
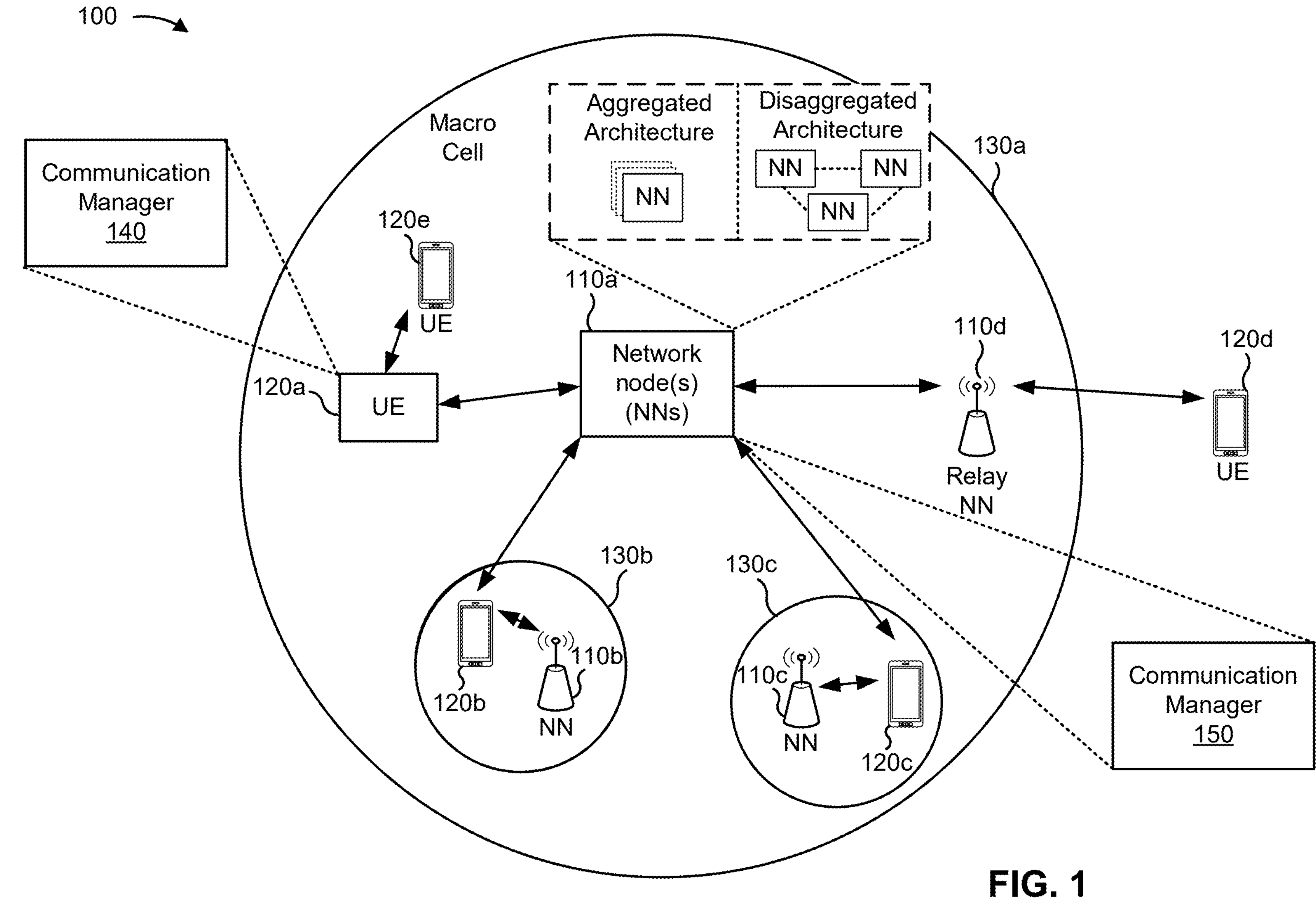
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A wireless communication system may support full-duplex (FD) communication. "FD communication" refers to simultaneous bi-directional communication between devices in a wireless network. For example, a network node operating in an FD mode may transmit a downlink communication and receive an uplink communication at the same time (for example, in the same slot or the same symbol). Sub-band full-duplex (SBFD) is a type of FD communication in which a network node may transmit a downlink communication and receive an uplink communication at the same time, but on different frequency resources. For example, the frequency resources used for downlink communication (e.g., a downlink sub-band) may be separated from the frequency resources used for uplink communication (e.g., an uplink sub-band), in the frequency domain, by a guard band. In some examples, SBFD communication may reduce traffic latency, increase network resource utilization, and enhance spectral efficiency in a wireless network. However, cross link interference (CLI) may be prevalent in SBFD communication. For example, in SBFD communication, when a user equipment (UE) in a cell is transmitting an uplink communication at the same time as another UE in the cell is receiving a downlink communication, intra-cell UE-to-UE CLI may occur (e.g., due to leakage from the uplink sub-band to the downlink sub-band). Such CLI decreases the performance and reliability of SBFD communication.

In some examples, a UE may be configured with CLI measurement resources for performing UE-to-UE CLI measurements. Such CLI measurement resources may be referred to as "UE-to-UE CLI measurement resources." For example, the UE-to-UE CLI measurements may include CLI received signal strength indicator (CLI-RSSI) measurements and/or sounding reference signal (SRS) reference signal received power (SRS-RSRP) measurements, among other examples. In some examples, a UE may be configured to measure CLI measurements (e.g., on a CLI reference signal and/or an SRS) in downlink symbols and/or downlink sub-bands of SBFD symbols (e.g., to measure CLI due to inter-sub-band leakage). In some aspects, when a UE is performing a UE-to-UE CLI measurement, it may be desirable to mute downlink communications/signals from a serving network node to achieve a clearer channel for a more accurate CLI measurement. In some examples, the UE may use uplink timing for a CLI measurement. In such examples, downlink communications and uplink communications may be restricted in the symbol(s) in which the UE performs the CLI measurement and a number (e.g., 2) of symbols preceding the symbol(s) in which the UE performs the CLI measurement. Although this provides a clear channel for the CLI measurement, this leads to inefficient utilization of network resources, which may increase network latency and decrease network reliability.

Various aspects relate generally to inter-UE (e.g., UE-to-UE) CLI measurements. Some aspects more specifically relate to downlink muting for inter-UE CLI measurements. In some aspects, a UE may receive, from a network node, configuration information indicating one or more UE-to-UE CLI measurement resources in one or more symbols (e.g., in one or more downlink symbols and/or in at least one downlink sub-band of one or more SBFD symbols). The UE may perform UE-to-UE CLI measurements in the one or more UE-to-UE CLI measurement resources. The UE may use downlink timing for the UE-to-UE CLI measurements, and downlink communications may not be muted in one or more symbols that immediately precede the one or more symbols in which the UE-to-UE CLI measurements are performed. The UE may transmit, to the network node, a measurement report that includes the results of the UE-to-UE CLI measurements.

In some aspects, a UE may receive, from a network node, configuration information indicating one or more UE-to-UE CLI measurement resources in one or more symbols (e.g., in at least one downlink sub-band of one or more SBFD symbols). The configuration information may indicate a resource element (RE)-level or resource block (RB)-level downlink muting pattern associated with the one or more UE-to-UE CLI measurement resources. For example, the RE-level or RB-level downlink muting pattern may indicate downlink muting in frequency resources of the one or more UE-to-UE CLI measurement resources. The UE may perform UE-to-UE CLI measurements in the one or more UE-to-UE CLI measurement resources, and the network node, in accordance with the downlink muting pattern, may refrain from transmitting downlink communications in the frequency resources of the one or more UE-to-UE CLI measurement resources in the one or more symbols in which the UE performs the UE-to-UE CLI measurements. In some examples, the UE, in accordance with the downlink muting pattern, may rate match around the one or more UE-to-UE CLI resources for a downlink communication received by the UE in the one or more downlink symbols in which the UE performs the UE-to-UE CLI measurements. The UE may transmit, to the network node, a measurement report that includes the results of the UE-to-UE CLI measurements.

In some aspects, the network node may exchange downlink muting patterns with a neighbor network node (e.g., a network node of a neighbor serving cell). For example, the neighbor network node may receive, from the network node, the downlink muting pattern associated with the one or more UE-to-UE CLI measurement resources for the UE-to-UE CLI measurements to be performed by the UE. The neighbor network node, in accordance with the downlink muting pattern received from the network node, may also refrain from transmitting downlink communications in the frequency resources of the one or more UE-to-UE CLI measurement resources in the one or more symbols in which the UE performs the UE-to-UE CLI measurements.

Particular aspects of the subject matter described in this disclosure can be implemented to realize one or more of the following potential advantages. In some examples, by using downlink timing for performing the UE-to-UE CLI measurements and allowing downlink communications to not be restricted or muted in one or more symbols that precede the symbols in which the UE-to-UE CLI measurements are performed, the described techniques can be used to increase the availability of network resources when performing UE-to-UE CLI measurements (e.g., as compared to the restriction on communications preceding the symbols in which the UE-to-UE CLI measurements are performed when using uplink timing for the UE-to-UE CLI measurements). As a result, network latency may be reduced and network reliability may be increased, while maintaining a clear channel for an accurate UE-to-UE CLI measurement.

In some examples, by configuring an RE-level or RB-level downlink muting pattern associated with the one or more UE-to-UE CLI measurement resources and enabling the UE to rate match around the UE-to-UE CLI measurement resources in the symbols in which the UE-to-UE CLI measurements are performed, the efficiency of network resource utilization may be increased and accurate CLI measurements may be achieved (e.g., due to the downlink muting in accordance with the downlink muting pattern). As a result, network latency may be further reduced and network reliability may be further increased.

In some examples, by exchanging the downlink muting patterns between network nodes of neighboring serving cells, downlink communications/signals from a neighbor network node may be muted in addition to downlink communications/signals from a serving network node being muted for CLI measurements performed by the UE. As a result, a clearer channel is achieved for the CLI measurements, resulting in further increased accuracy (e.g., as compared with downlink muting only for the serving network node) for the CLI measurements. This may lead to improved CLI mitigation by the serving network node.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node May have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 May be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE **120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V21) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110**) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources; perform one or more UE-to-UE CLI measurements in the one or more UE-to-UE CLI measurement resources; and transmit, to the network node, a measurement report including results of the one or more UE-to-UE CLI measurements.

Additionally, or alternatively, as described in more detail elsewhere herein, the communication manager 140 may receive, from a network node, configuration information indicating one or more UE-to-UE CLI measurement resources in one or more symbols; perform one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols; and transmit, to the network node, a measurement report including results of the one or more UE-to-UE CLI measurements. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources; and receive, from the UE, a measurement report including results of one or more UE-to-UE CLI measurements associated with the one or more UE-to-UE CLI measurement resources.

Additionally, or alternatively, as described in more detail elsewhere herein, the communication manager 150 may transmit, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols; and receive, from the UE, a measurement report including results of the one or more UE-to-UE CLI measurements. Additionally, or alternatively, the communication manager 150 may perform one or more other operations described herein.

As indicated above, FIG. 1 is provided as an example. Other examples may differ from what is described with regard to FIG. 1.

Figure 2:
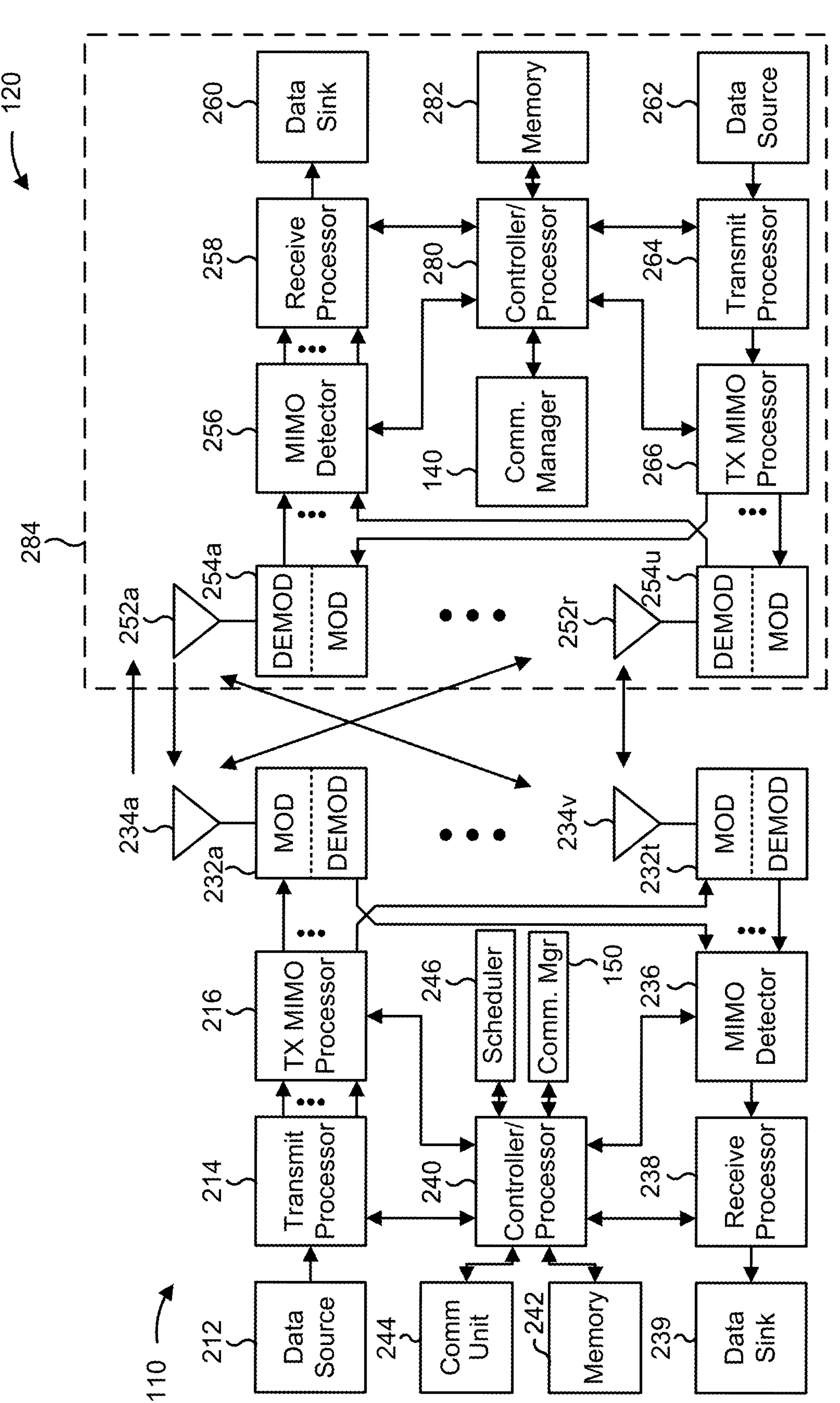
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
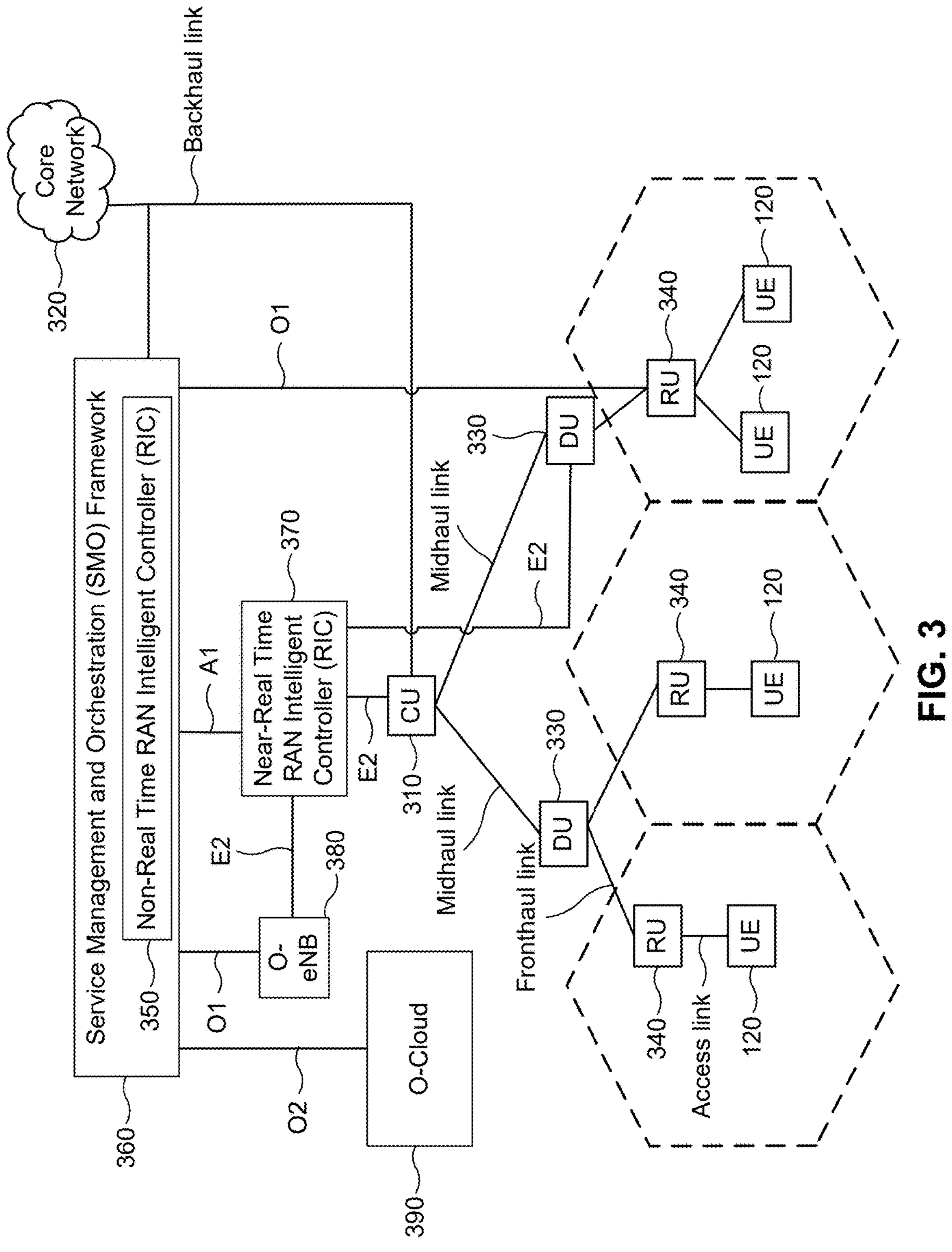
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with downlink muting for inter-UE CLI measurements, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1100 of FIG. 11, process 1200 of FIG. 12, process 1300 of FIG. 13, process 1400 of FIG. 14, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication.

The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1100 of FIG. 11, process 1200 of FIG. 12, process 1300 of FIG. 13, process 1400 of FIG. 14, or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources; means for performing one or more UE-to-UE CLI measurements in the one or more UE-to-UE CLI measurement resources; and/or means for transmitting, to the network node, a measurement report including results of the one or more UE-to-UE CLI measurements.

In some aspects, a UE (e.g., the UE 120) includes means for receiving, from a network node, configuration information indicating one or more UE-to-UE CLI measurement resources in one or more symbols; means for performing one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols; and/or means for transmitting, to the network node, a measurement report including results of the one or more UE-to-UE CLI measurements. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, configuration information indicating one or more UE-to-UE CLI measurement resources, within at least one downlink sub-band in one or SBFD symbols, and indicating an RE-level or RB-level downlink muting pattern associated with the one or more UE-to-UE CLI measurement resources; and/or means for receiving, from the UE, a measurement report including results of one or more UE-to-UE CLI measurements associated with the one or more UE-to-UE CLI measurement resources.

In some aspects, a network node (e.g., the network node 110) includes means for transmitting, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols; and/or means for receiving, from the UE, a measurement report including results of the one or more UE-to-UE CLI measurements. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4B:
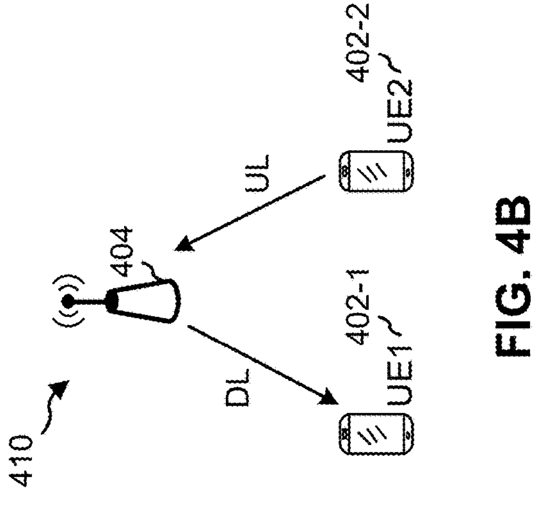
FIGS. 4A-4C are diagrams illustrating examples of full duplex (FD) communication in accordance with the present disclosure.
Figure 4C:
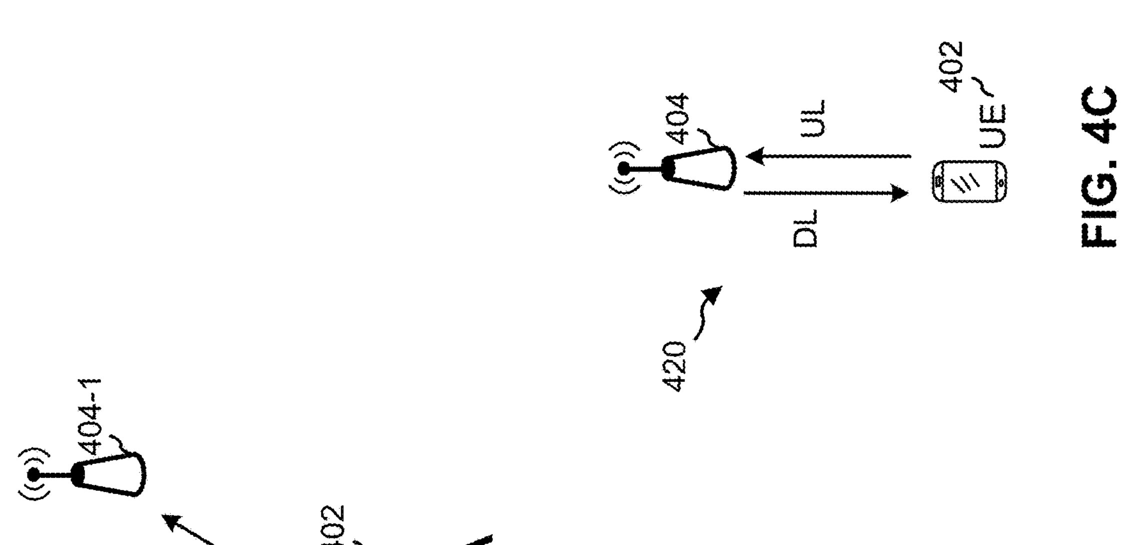
Figure 4A:
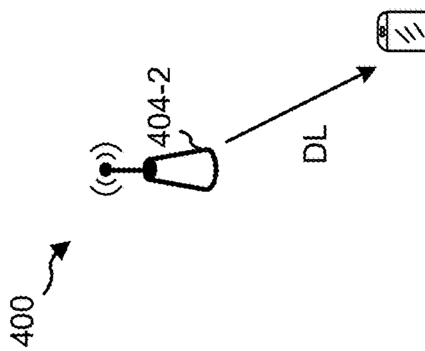

FIGS. 4A-4C are diagrams illustrating examples 400, 410, 420 of FD communication in accordance with the present disclosure. "Full duplex communication" (or "FD communication") in a wireless network refers to simultaneous bi-directional communication between devices in the wireless network. For example, a UE operating in an FD mode may transmit an uplink communication and receive a downlink communication at the same time (for example, in the same slot or the same symbol). A network node operating in an FD mode may transmit a downlink communication and receive an uplink communication at the same time (for example, in the same slot or the same symbol). "Half-duplex (HD) communication" in a wireless network refers to unidirectional communications (for example, only downlink communication or only uplink communication) between devices at a given time (for example, in a given slot or a given symbol).

The example 400 of FIG. 4A includes a UE 402 and two network nodes (for example, TRPs) 404-1, 404-2, where the UE 402 is sending uplink (UL) transmissions to the network node 404-1 and is receiving downlink (DL) transmissions from the network node 404-2. In the example 400 of FIG. 4A, FD is enabled for the UE1 402, but not for the network nodes 404-1, 404-2. The example 410 of FIG. 4B includes two UEs, shown as UE1 402-1 and UE2 402-2, and a network node 404, where the UE1 402-1 is receiving a DL transmission from the network node 404 and the UE2 402-2 is transmitting an UL transmission to the network node 404. In the example 410 of FIG. 4B, FD is enabled for the network node 404, but not for the UE1 402-1 and the UE2 402-2. The example 420 of FIG. 4C includes a UE 402 and a network node 404, where the UE 402 is receiving a DL transmission from the network node 404 and the UE 402 is transmitting an UL transmission to the network node 404. In the example 420 of FIG. 4C, FD is enabled for both the UE 402 and the network node 404.

As indicated above, FIGS. 4A-4C are provided as examples. Other examples may differ from what is described with regard to FIGS. 4A-4C.

Figure 5:
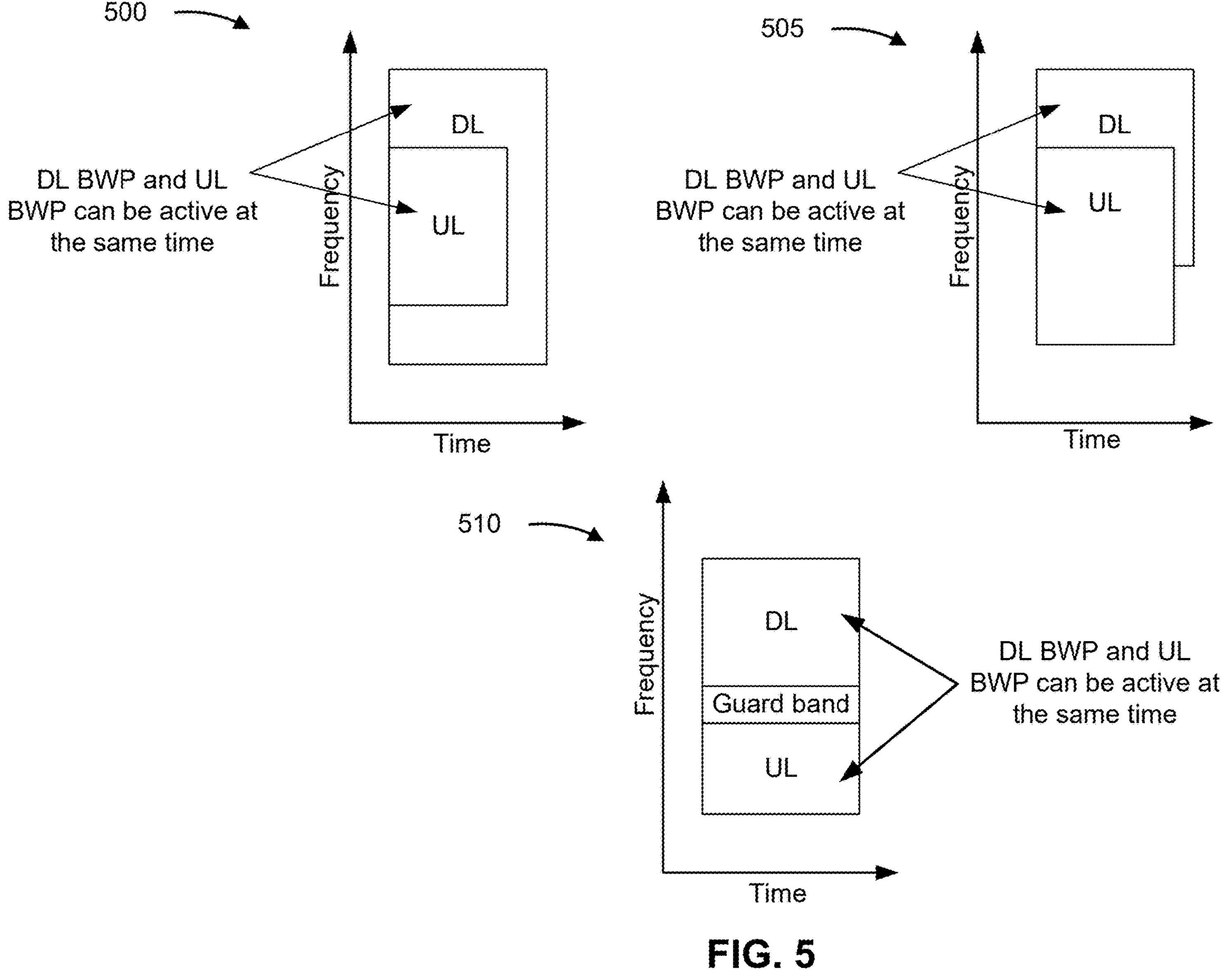
FIG. 5 is a diagram illustrating examples of FD communication in a wireless network, in accordance with the present disclosure.

FIG. 5 is a diagram illustrating examples 500, 505, and 510 of FD communication in a wireless network, in accordance with the present disclosure.

As shown in FIG. 5, examples 500 and 505 show examples of IBFD communication. In IBFD, a network node may transmit a downlink communication and receive an uplink communication on the same time and frequency resources. As shown in example 500, in a first example of IBFD, which may be referred to a "fully overlapping IBFD," the time and frequency resources for uplink communication may fully overlap with the time and frequency resources for downlink communication. As shown in example 505, in a second example of IBFD, which may be referred to as "partial overlapping IBFD," the time and frequency resources for uplink communication may partially overlap with the time and frequency resources for downlink communication.

As further shown in FIG. 5, example 510 shows an example of SBFD communication, which may also be referred to as "sub-band frequency division duplex (SBFDD)" or "flexible duplex." In SBFD, a network node may transmit a downlink communication and receive an uplink communication at the same time, but on different frequency resources. For example, the different frequency resources may be sub-bands of a frequency band, such as a time division duplexing band. In this case, the frequency resources used for downlink communication (for example, the downlink sub-band) may be separated from the frequency resources used for uplink communication (for example, the uplink sub-band), in the frequency domain, by a guard band.

As indicated above, FIG. 5 is provided as an example. Other examples may differ from what is described with regard to FIG. 5.

Figure 6:
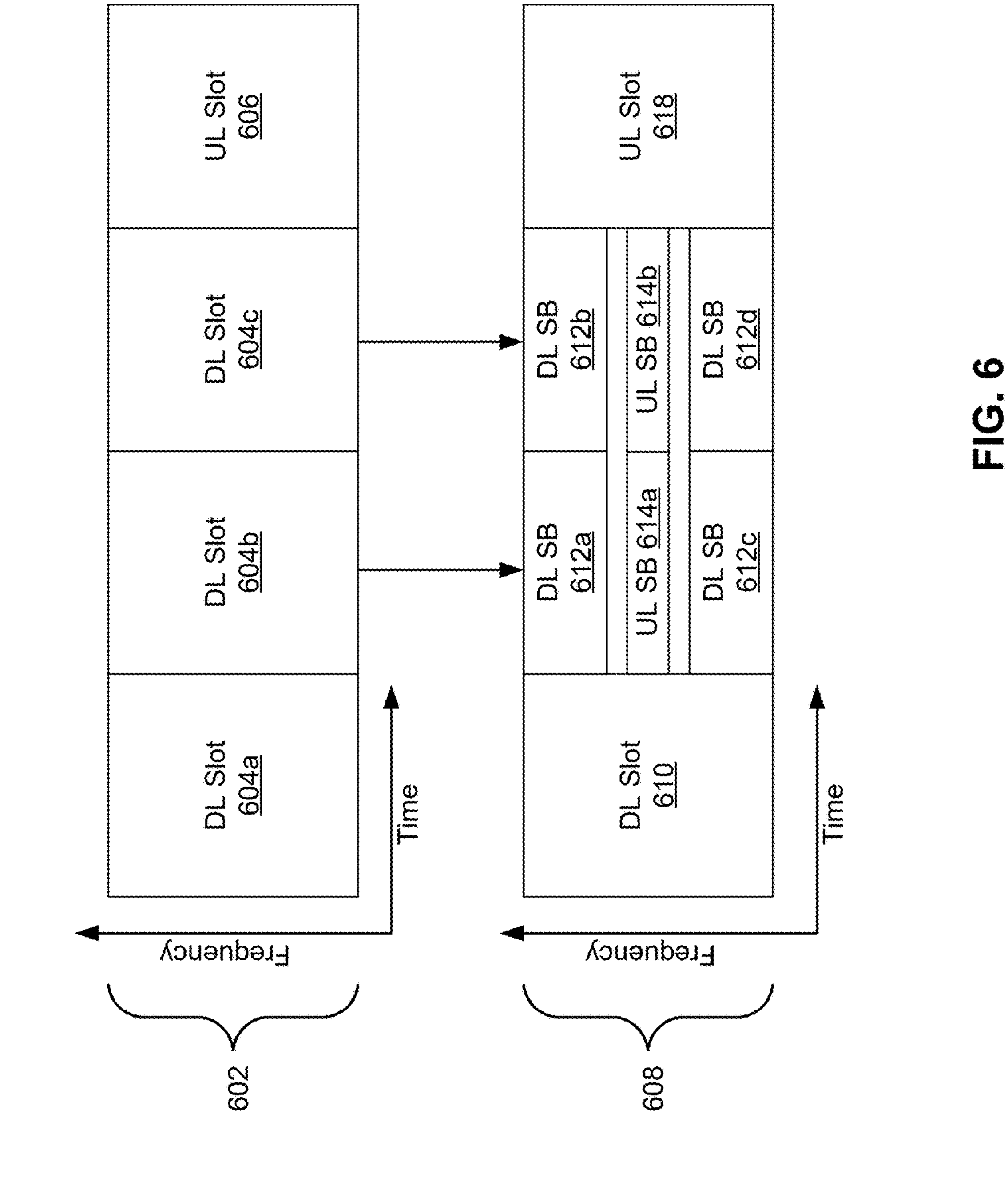
FIG. 6 is a diagram illustrating an example of sub-band full-duplex (SBFD) activation, in accordance with the present disclosure.

FIG. 6 is a diagram illustrating an example 600 of SBFD activation, in accordance with the present disclosure. As shown in FIG. 6, example 600 includes a first configuration 602. In some aspects, the first configuration 602 may indicate a first slot format pattern (sometimes called a TDD pattern) associated with an HD mode or an FD mode. The first slot format pattern may include a quantity of downlink slots (for example, three downlink slots 604*a*, 604*b*, and 604*c*, as shown), a quantity of flexible slots (not shown), and/or a quantity of uplink slots (for example, one uplink slot 606, as shown). The first slot format pattern may repeat over time. In some examples, a network node (for example, network node 110) may indicate the first slot format pattern to a UE (for example, UE 120) using one or more slot format indicators. A slot format indicator, for a slot, may indicate whether that slot is an uplink slot, a downlink slot, or a flexible slot, among other examples.

A network node may instruct (for example, using an indication, such as an RRC message, a MAC-CE, or DCI) a UE to switch from the first configuration 602 to a second configuration 608. As an alternative, the UE may indicate to the network node that the UE is switching from the first configuration 602 to the second configuration 608. The second configuration 608 may indicate a second slot format pattern that repeats over time, similar to the first slot format pattern. In any of the examples described above, the UE may switch from the first configuration 602 to the second configuration 608 during a time period (for example, a quantity of symbols and/or an amount of time (for example, in ms)) based on or otherwise associated with an indication received from the network node (for example, before switching back to the first configuration 602). During that time period, the UE may communicate using the second slot format pattern, and then may revert to using the first slot format pattern after the end of the time period. The time period may be indicated by the network node (for example, in the instruction to switch from the first configuration 602 to the second configuration 608, as described above) and/or based on or otherwise associated with a programmed and/or otherwise preconfigured rule. For example, the rule may be based on or otherwise associated with a table (for example, defined in 3GPP specifications and/or another wireless communication standard) that associates different sub-carrier spacings (SCSs) and/or numerologies (for example, represented by u and associated with corresponding SCSs) with corresponding time periods for switching configurations.

In example 600, the second slot format pattern includes a downlink slot 610, two SBFD slots in place of what were downlink slots in the first slot format pattern, and an uplink slot 618. In example 600, each SBFD slot includes at least one downlink sub-band (SB) (for example, DL SBs 612*a*, 612*b*, 612*c*, and 612*d*, as shown) and at least one uplink SB (for example, UL SBs 614*a* and 614*b*, as shown). Accordingly, the UE may operate using the second slot format pattern to transmit an uplink communication in an earlier slot (for example, the second slot in sequence, using UL SB 614*a*), as compared to using the first slot format pattern (for example, the fourth slot in sequence, shown as UL slot 606). Other examples may include additional or alternative changes. For example, the second configuration 608 may indicate an SBFD slot in place of what was an uplink slot in the first configuration 602 (for example, UL slot 606). In another example, the second configuration 608 may indicate a downlink slot or an uplink slot in place of what was an SBFD slot in the first configuration 602 (not shown in FIG. 6). In yet another example, the second configuration 608 may indicate a downlink slot or an uplink slot in place of what was an uplink slot or a downlink slot, respectively, in the first configuration 602. An "SBFD slot" may refer to a slot in which an SBFD format is used. An SBFD format may include a slot format in which full duplex communication is supported (for example, for both uplink and downlink communications), with one or more frequencies used for an uplink SB of the slot being separated from one or more frequencies used for a downlink SB of the slot by a guard band. In some examples, the SBFD format may include a single uplink SB and a single downlink SB separated by a guard band. In some examples, the SBFD format may include multiple downlink SBs and a single uplink SB that is separated from the multiple downlink SBs by respective guard bands (for example, as shown in FIG. 6). In some examples, an SBFD format may include multiple uplink SBs and a single downlink SB that is separated from the multiple uplink SBs by respective guard bands. In some examples, the SBFD format may include multiple uplink SBs and multiple downlink SBs, where each uplink SB is separated from a downlink SB by a guard band. In some examples, operating using an SBFD mode may include activating or using an FD mode in one or more slots based on or otherwise associated with the one or more slots having the SBFD format. A slot may support the SBFD mode if an UL BWP and a DL BWP are permitted to be or are simultaneously active in the slot in an SBFD fashion (for example, with guard band separation).

By switching from the first configuration 602 to the second configuration 608, the network node and the UE may experience increased quality and/or reliability of communications. For example, the network node and the UE may experience increased throughput (for example, using an FD mode), reduced latency (for example, the UE 120 may be able to transmit an uplink communication and/or receive a downlink communication sooner using the second configuration 608 rather than the first configuration 602), and increased network resource utilization (for example, by using both the DL BWP and the UL BWP simultaneously instead of only the DL BWP or the UL BWP).

As indicated above, FIG. 6 is provided as an example. Other examples may differ from what is described with regard to FIG. 6.

Figure 7:
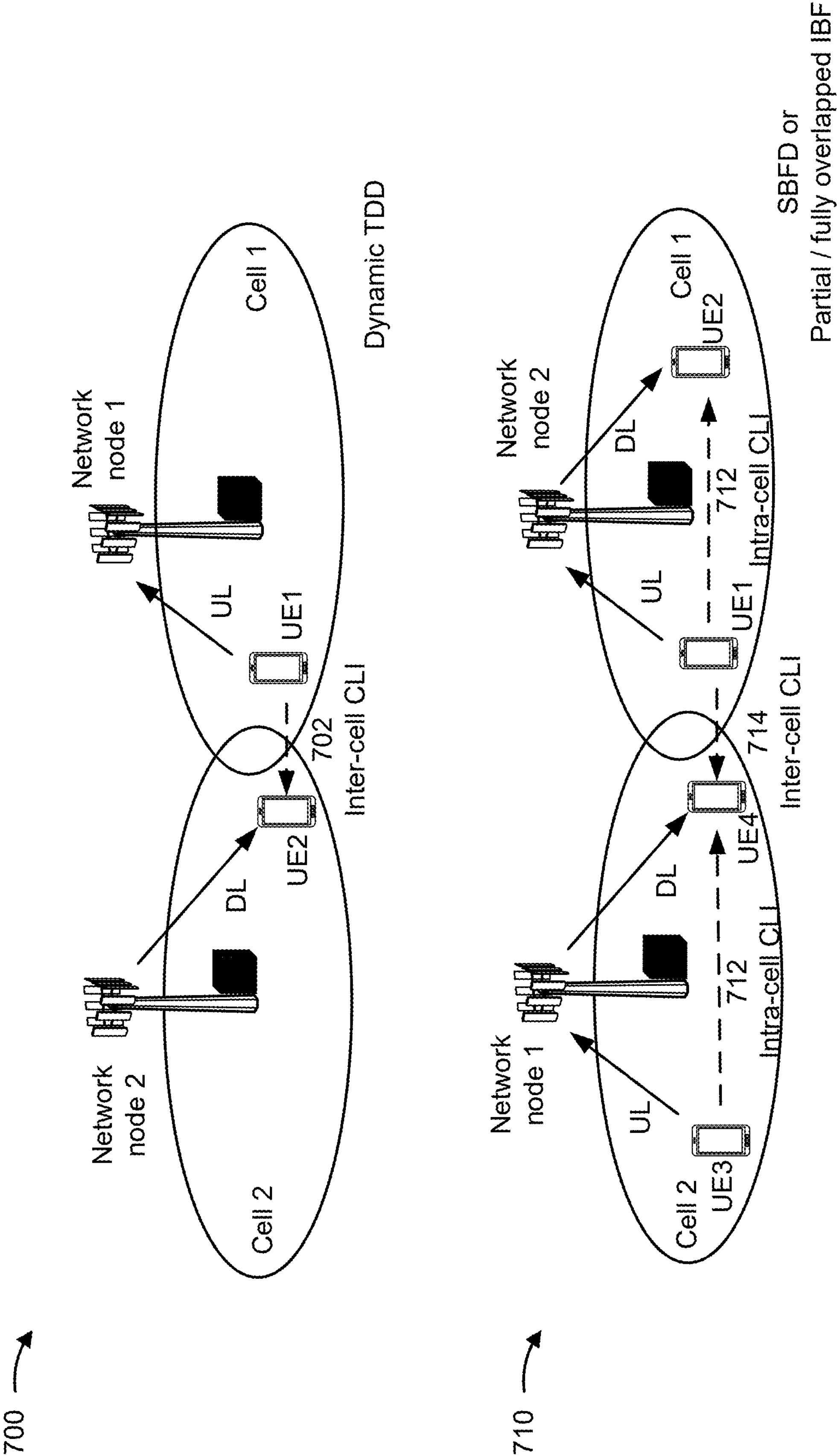
FIG. 7 is a diagram illustrating examples relating to UE-to-UE cross link interference (CLI), in accordance with the present disclosure.

FIG. 7 is a diagram illustrating examples 700 and 710 relating to UE-to-UE CLI, in accordance with the present disclosure.

Example 700 shows an example of dynamic TDD communication. As shown in example 700, when dynamic TDD is implemented, neighboring cells (cell 1 and cell 2) may use different TDD configurations to communicate with UEs, which may result in an uplink communication between a first UE (UE1) and a first network node (network node 1) in a same transmission time interval (TTI) as a downlink communication between a second network node (network node 2) and a second UE (UE2). These communications in different transmission directions (for example, downlink versus uplink) in the same TTI may interfere with one another, which may be referred to as CLI. Interference with reception of a downlink communication by one UE caused by transmission of an uplink communication by another UE may be referred to as UE-to-UE CLI or inter-UE CLI.

For example, as shown by reference number 702, in the dynamic TDD scenario, transmission of the uplink communication in a symbol or a slot by UE1 in cell 1 may interfere with reception of the downlink communication in the symbol or the slot by UE2 in cell 2. Such interference may be referred to as inter-cell UE-to-UE CLI or inter-cell inter-UE CLI.

Example 710 shows an example of FD communication, such as SBFD, fully overlapping IBFD, or partial overlapping IBFD. As shown by reference number 712, in an FD scenario, transmission of an uplink communication in an SBFD or IBFD slot or symbol by one UE in a cell may interfere with reception of a downlink communication in the SBFD or IBFD slot or symbol by another UE in the cell. For example, transmission of an uplink communication in an SBFD or IBFD slot or symbol by a first UE (UE1) in a first cell (cell 1) may interfere with reception of a downlink communication in the SBFD or IBFD slot or symbol by a second UE (UE2) in cell 1. As another example, transmission of an uplink communication in an SBFD or IBFD slot or symbol by a third UE (UE3) in a second cell (cell 2) may interfere with reception of a downlink communication in the SBFD or IBFD slot or symbol by a fourth UE (UE4) in cell 2. Such interference may be referred to as intra-cell UE-to-UE CLI or intra-cell inter-UE CLI. In an SBFD scenario, transmission of an uplink communication on an uplink SB in an SBFD symbol or slot by one UE (for example, UE1) in a cell (for example, cell 1) may interfere with reception of a downlink communication on a downlink SB in the SBFD symbol or slot by another UE (for example, UE2) in the cell. Such interference may be referred to as inter-SB intra-cell UE-to-UE CLI or inter-SB intra-cell inter-UE CLI.

As shown by reference number 714, in an FD scenario, transmission of an uplink communication in an SBFD or an IBFD symbol or slot by UE1 in cell 1 may interfere with reception of a downlink communication in the SBFD of IBFD symbol or slot by UE4 in cell 2. Such interference may be referred to as inter-cell inter-UE CLI. In an SBFD scenario, transmission of an uplink communication on an uplink SB in an SBFD symbol or slot by UE1 in cell 1 may interfere with reception of a downlink communication on a downlink SB in the SBFD symbol or slot by UE4 in cell 2. Such interference may be referred to as inter-SB inter-cell inter-UE CLI.

In some examples, a UE may be configured with UE-to-UE CLI measurement resources for performing UE-to-UE CLI measurements (e.g., inter-UE CLI measurements). For example, the UE-to-UE CLI measurements may include CLI-RSSI measurements and/or SRS-RSRP measurements, among other examples. In some examples, a UE may be configured to measure UE-to-UE CLI measurements (e.g., on a CLI reference signal and/or an SRS) in downlink symbols and/or downlink sub-bands of SBFD symbols (e.g., to measure inter-UE CLI due to inter-sub-band leakage). In some aspects, when a UE is performing a UE-to-UE CLI measurement, it may be desirable to mute downlink communications/signals from a serving network node to achieve a clearer channel for a more accurate CLI measurement.

In some examples, the UE may use uplink timing for a CLI measurement. For example, a wireless communication standard (e.g., 3GPP technical specification (TS) 38.133 section 9.7) may specify that when the UE measures SRS-RSRP and CLI-RSSI, a constant offset relative to the downlink reference timing in the serving cell is to be applied. The constant offset value may be derived by the UE implementation, and may be required to be at least a certain value (e.g., $T_c$*NTA_offset, where $T_c$ is a basic timing unit and NTA_offset is a timing advance offset). In such examples, downlink communications and uplink communications may be restricted in the symbol(s) in which the UE performs the CLI measurement and a number (e.g., 2) of symbols preceding the symbol(s) in which the UE performs the CLI measurement. For example, a wireless communication standard (e.g., 3GPP TS 38.214) may specify that for the UE 120 which does not support cli-SRS-RSRP-FDM-DL, the UE may not be expected to receive PDCCH/PDSCH/CSI-RS for tracking/CSI-RS for CQI on OFDM symbols on which the UE performs SRS-RSRP measurements, and on 2 data symbols before an OFDM symbol used for SRS-RSRP measurements for 120 kHz subcarrier spacing. For the UE which does not support cli-RSSI-FDM-DL, the UE may not be expected to receive PDCCH/PDSCH/CSI-RS for tracking/CSI-RS for CQI on OFDM symbols on which the UE performs CLI-RSSI measurements, and on 2 data symbols before an OFDM symbol used for CLI-RSSI measurements for 120 kHz subcarrier spacing. The UE 120 may not be expected to transmit PUCCH/PUSCH/SRS on OFDM symbols on which the UE 120 performs CLI measurements, and on 2 data symbols before an OFDM symbol used for CLI measurements for 120 kHz subcarrier spacing. Although this may provide a clear channel for an accurate CLI measurement, this leads to inefficient utilization of network resources, which may increase network latency and decrease network reliability.

As indicated above, FIG. 7 is provided as an example. Other examples may differ from what is described with regard to FIG. 7.

Figure 8:
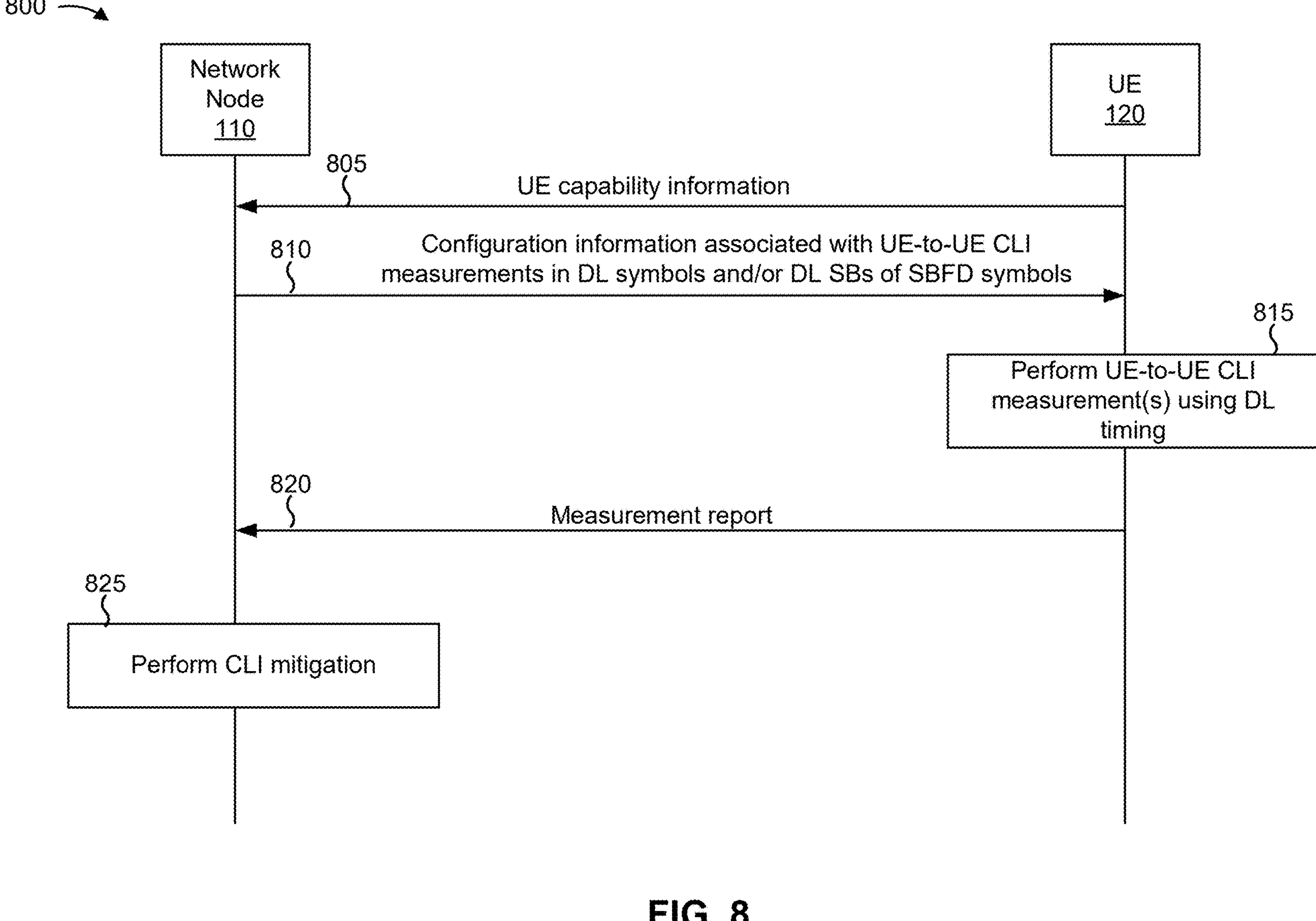
FIG. 8 is a diagram illustrating an example associated with performing inter-UE CLI measurements using downlink timing, in accordance with the present disclosure.

FIG. 8 is a diagram illustrating an example 800 associated with performing inter-UE CLI measurements using downlink timing, in accordance with the present disclosure. As shown in FIG. 8, example 800 includes communication between a network node 110 and a UE 120. In some aspects, the network node 110 and the UE 120 may be included in a wireless communication network, such as wireless communication network 100. The network node 110 and the UE 120 may communicate via a wireless access link, which may include an uplink and a downlink.

As shown in FIG. 8, and by reference number 805, the UE 120 may transmit, and the network node 110 may receive, UE capability information. The UE capability information may indicate whether the UE 120 supports a feature and/or one or more parameters related to the feature. For example, the UE capability information may indicate a capability of the UE 120 to perform UE-to-UE CLI measurements and/or one or more parameters related to a capability of the UE 120 to perform UE-to-UE CLI measurements. In some aspects, the UE capability information may indicate whether the UE 120 supports frequency division multiplexing (FDM) of CLI measurement resources (e.g., UE-to-UE CLI measurement resources) and downlink communications. For example, the UE capability information may indicate whether the UE 120 supports FDM of SRS-RSRP measurement resources and downlink communications (e.g., cli-SRS-FDM-DL) and/or whether the UE 120 supports FDM of CLI-RSSI measurement resources and downlink communications (e.g., cli-RSSI-FDM-DL). One or more operations described herein may be based on or otherwise associated with the UE capability information transmitted by the UE 120. For example, the UE 120 may perform a communication in accordance with the UE capability information, or may receive configuration information that is in accordance with the UE capability information.

As further shown in FIG. 8, and by reference number 810, the network node 110 may transmit, and the UE 120 may receive, configuration information associated with UE-to-UE CLI measurements in one or more downlink symbols and/or downlink sub-bands of SBFD symbols. For example, the configuration information may be included in one or more RRC messages, one or more MAC-CEs, or DCI. In some aspects, the configuration information may indicate one or more UE-to-UE CLI measurement resources in which respective UE-to-UE CLI measurements are to be performed by the UE 120. For example, the UE-to-UE CLI measurement resources may be time and frequency resources on which the UE 120 is to perform UE-to-UE CLI measurements. In such examples, the UE 120 may be a victim UE configured to measure, in the UE-to-UE CLI measurement resources, UE-to-UE CLI (e.g., CLI-RSSI and/or SRS-RSRP) at the UE 120 caused by one or more aggressor UEs. In some aspects, the network node 110 may transmit, to the one or more aggressor UEs, configuration information that configures the one or more aggressor UEs to transmit a signal (for example, an uplink reference signal, such as an SRS) in the one or more CLI resources to be measured by the UE 120. In some examples, the UE-to-UE CLI measurement resources may include one or more CLI-RSSI measurement resources in which respective CLI-RSSI measurements are to be performed by the UE 120. Additionally, or alternatively, the UE-to-UE CLI measurement resources may include one or more SRS-RSRP measurement resources in which respective SRS-RSRP measurements are to be performed by the UE 120. In some aspects, the UE-to-UE CLI measurement resources may be periodic (e.g., for periodic UE-to-UE CLI measurement resources by the UE 120), semi-persistent (e.g., for semi-persistent UE-to-UE CLI measurement resources by the UE 120), or aperiodic/dynamic (e.g., for aperiodic UE-to-UE CLI measurement resources by the UE 120).

In some aspects, the configuration information may configure the UE 120 with one or more UE-to-UE CLI measurement resources in at least one downlink sub-band of one or more SBFD symbols. In such examples, the one or more UE-to-UE CLI measurements to be performed by the UE 120 may be measurements of inter-SB leakage (e.g., inter-SB intra-cell UE-to-UE CLI and/or inter-SB inter-cell UE-to-UE CLI). Additionally, or alternatively, the configuration information may configure the UE 120 with one or more UE-to-UE CLI measurement resources in one or more downlink symbols. In such examples, the one or more UE-to-UE CLI measurements to be performed by the UE 120 may be measurements of inter-SB inter-cell UE-to-UE CLI. In some aspects, the configuration information may include a configuration of a measurement report to be transmitted by the UE 120 to report the results of the UE-to-UE CLI measurements performed by the UE 120.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication may include a dynamic indication, such as one or more MAC-CEs (e.g., to activate/deactivate semi-persistent UE-to-UE CLI measurement resources) and/or one or more DCI messages (e.g., to trigger aperiodic UE-to-UE CLI measurement resources), among other examples.

As further shown in FIG. 8, and by reference number 815, the UE 120 may perform one or more UE-to-UE CLI measurements in the one or more UE-to-UE CLI measurement resources indicated in the configuration information. For example, the UE 120 may perform the one or more UE-to-UE CLI measurements in at least one downlink sub-band of one or more SBFD symbols. Additionally, or alternatively, the UE 120 may perform the one or more UE-to-UE CLI measurements in one or more downlink symbols. In some aspects, the one or more UE-to-UE CLI measurements may include one or more CLI-RSSI measurements and/or one or more SRS-RSRP measurements. Additionally, or alternatively, the one or more UE-to-UE CLI measurements may include measurements of other CLI metrics (e.g., CLI signal-to-interference-plus-noise ratio (SINR), among other examples). The UE 120 may perform the UE-to-UE CLI measurements (e.g., measure the CLI-RSSI, SRS-RSRP, and/or one or more other CLI metrics) based at least in part on a signal (e.g., an uplink reference signal, such as an SRS) transmitted by one or more other UEs (e.g., one or more aggressor UEs) in the one or more UE-to-UE CLI measurement resources.

In some aspects, the UE 120 may use downlink timing for the one or more UE-to-UE CLI measurements. For example, the UE 120 may use downlink reference timing in the serving cell when the UE 120 performs the UE-to-UE CLI measurements (e.g., when the UE 120 measures CLI-RSSI and/or SRS-RSRP). In such examples, the UE 120 may not use uplink timing for the UE-to-UE CLI measurements. For example, the UE 120 may not apply an offset relative to the downlink reference timing in the serving cell when the UE 120 performs the UE-to-UE CLI measurements (e.g., when the UE 120 measures CLI-RSSI and/or SRS-RSRP). In some aspects, because downlink timing is used (e.g., by the UE 120) for the one or more UE-to-UE CLI measurements, restrictions on communications in the symbols preceding the one or more symbols in which the UE-to-UE CLI measurements are performed (e.g., restrictions on the preceding symbols specified in 3GPP TS 38.214) may be relaxed or lifted.

In some aspects, downlink communications (e.g., PDCCH, PDSCH, CSI-RS) may not be restricted in the symbols preceding the one or more symbols in which the UE-to-UE CLI measurements are performed. That is, downlink communications may not be muted in one or more symbols that immediately precede the one or more symbols in which the UE-to-UE CLI measurements are performed. For example, downlink communications may not be restricted (e.g., downlink communications may not be muted) in the two consecutive symbols that immediately precede the one or more symbols in which the UE-to-UE CLI measurements are performed. The two consecutive symbols that immediately precede a symbol in which a UE-to-UE CLI measurement is performed are the last two symbols before the symbol in which a UE-to-UE CLI measurement is performed. In such examples, the network node 110 may transmit, and the UE 120 (or one or more other UEs) may receive, one or more downlink communications in the one or more symbols that immediately precede the one or more symbols in which the UE-to-UE CLI measurements are performed. Additionally, or alternatively, in some aspects, uplink communications (e.g., PUCCH, PUSCH, SRS) may not be restricted in the symbols preceding the one or more symbols in which the UE-to-UE CLI measurements are performed. For example, uplink communications may not be restricted in the two consecutive symbols that immediately precede the one or more symbols in which the UE-to-UE CLI measurements are performed. In such examples, the UE 120 (or one or more other UEs) may transmit, and the network node 110 may receive, one or more uplink communications in the one or more symbols that immediately precede the one or more symbols in which the UE-to-UE CLI measurements are performed.

In some aspects, the network node 110 may refrain from transmitting downlink communications in the one or more symbols in which the UE-to-UE CLI measurements are performed. For example, downlink communications may be restricted (e.g., in accordance with a wireless communication standard) in the one or more symbols in which the UE-to-UE CLI measurements are performed. In some examples, downlink communications may be restricted (e.g., the UE 120 may refrain from transmitting downlink communications) in the one or more symbols in which the UE-to-UE CLI measurements are performed based at least in part on the UE 120 (e.g., the UE that performs the UE-to-UE CLI measurements) not supporting FDM of the UE-to-UE CLI measurement resources with downlink communications. For example, for the UE 120 which does not support cli-SRS-RSRP-FDM-DL, the UE 120 may not be expected to receive PDCCH/PDSCH/CSI-RS for tracking/CSI-RS for CQI on OFDM symbols on which the UE 120 performs SRS-RSRP measurements. For the UE 120 which does not support cli-RSSI-FDM-DL, the UE 120 may not be expected to receive PDCCH/PDSCH/CSI-RS for tracking/CSI-RS for CQI on OFDM symbols on which the UE 120 performs CLI-RSSI measurements. In some aspects, uplink communications (e.g., other than uplink reference signals configured for the UE-to-UE CLI measurements) may also be restricted in the one or more symbols in which the UE-to-UE CLI measurements are performed. For example, the UE 120 may not be expected to transmit PUCCH/PUSCH/SRS on OFDM symbols on which the UE 120 performs CLI measurements.

As further shown in FIG. 8, and by reference number 820, the UE 120 may transmit, and the network node 110 may receive, a measurement report that includes the results of the one or more UE-to-UE CLI measurements performed by the UE 120. For example, the measurement report may include one or more CLI-RSSI values measured by the UE 120 and/or one or more SRS-RSRP values measured by the UE 120. Additionally, or alternatively, the measurement report may include one or more values for one or more other CLI metrics (e.g., CLI SINR) measured by the UE 120. The UE 120 may transmit the measurement report in accordance with the configuration of the measurement report indicated in the configuration information. In some aspects, the UE 120 may transmit the measurement report via PUCCH or PUSCH resources.

As further shown in FIG. 8, and by reference number 825, in some aspects, the network node 110 may perform CLI mitigation. For example, the network node 110 may apply a CLI mitigation mechanism to reduce UE-to-UE CLI on one or more downlink communications scheduled for the UE 120. The network node 110 may perform CLI mitigation based at least in part on the measurement report received from the UE 120. For example, the network node 110 may perform CLI mitigation based at least in part on the one or more UE-to-UE CLI measurements included in the measurement report. In some aspects, the network node 110 may perform beam switching to switch a downlink beam associated with a downlink communication to be transmitted to the UE 120 to avoid a beam with strong CLI, and thus reduce UE-to-UE CLI on the downlink communication. Additionally or alternatively, the network node 110 may switch an uplink beam associated with an uplink communication to be transmitted by an aggressor UE to a different uplink beam that reduces UE-to-UE CLI on the downlink communication to be transmitted to the UE 120. In some aspects, the network node 110 may switch a pairing of UEs scheduled for simultaneous (or overlapping) downlink and uplink communications. For example, the network node 110 may switch another UE, that is scheduled for uplink communications in a same SBFD slot or symbol in which the UE 120 is scheduled for downlink communications, from an aggressor UE causing strong UE-to-UE CLI on the downlink communications of the UE 120. In some aspects, the network node 110 may perform CLI mitigation by causing an aggressor UE to reduce a transmit power of uplink communications transmitted by the aggressor UE.

As indicated above, FIG. 8 is provided as an example. Other examples may differ from what is described with respect to FIG. 8.

Figure 9A:
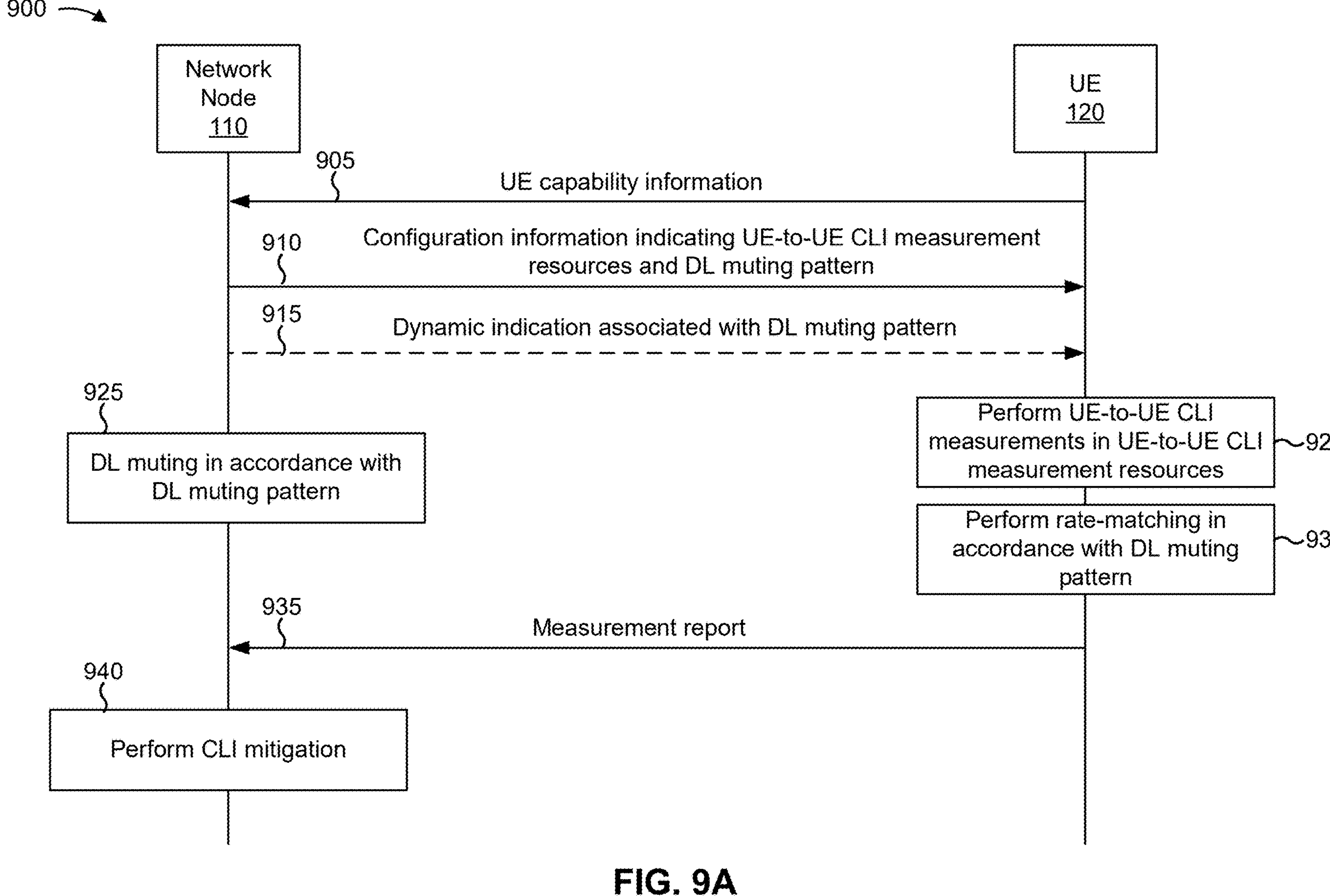
FIGS. 9A-9B are diagrams illustrating an example associated with downlink muting for inter-UE CLI measurements, in accordance with the present disclosure.
Figure 9B:
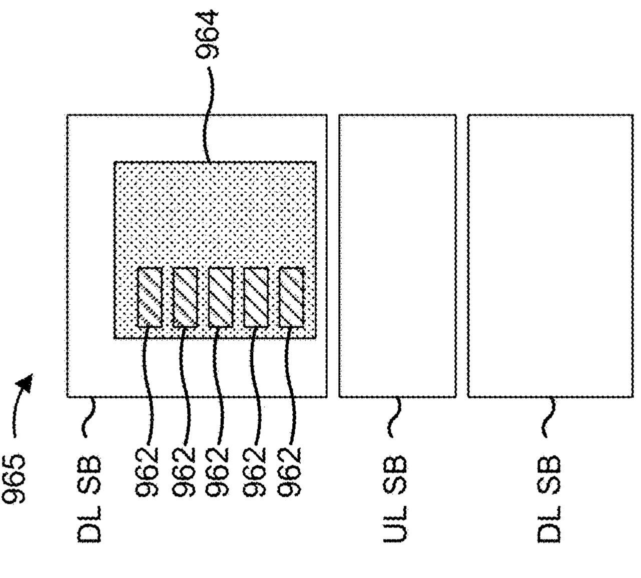
Figure 9B:
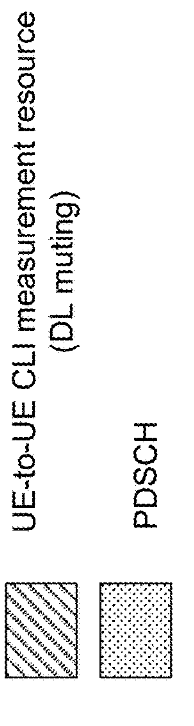
Figure 9B:
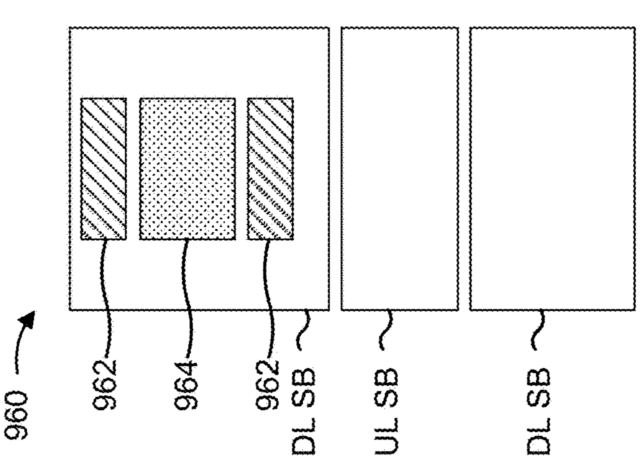

FIGS. 9A-9B are diagrams illustrating an example 900 associated with downlink muting for inter-UE CLI measurements, in accordance with the present disclosure. As shown in FIG. 9A, example 900 includes communication between a network node 110 and a UE 120. In some aspects, the network node 110 and the UE 120 may be included in a wireless communication network, such as wireless communication network 100. The network node 110 and the UE 120 may communicate via a wireless access link, which may include an uplink and a downlink.

As shown in FIG. 9A, and by reference number 905, the UE 120 may transmit, and the network node 110 may receive, UE capability information. The UE capability information may indicate whether the UE 120 supports a feature and/or one or more parameters related to the feature. For example, the UE capability information may indicate a capability of the UE 120 to perform UE-to-UE CLI measurements and/or one or more parameters related to a capability of the UE 120 to perform UE-to-UE CLI measurements. In some aspects, the UE capability information may indicate whether the UE 120 supports FDM of CLI measurement resources (e.g., UE-to-UE CLI measurement resources) and downlink communications. For example, the UE capability information may indicate whether the UE 120 supports FDM of SRS-RSRP measurement resources and downlink communications (e.g., cli-SRS-FDM-DL) and/or whether the UE 120 supports FDM of CLI-RSSI measurement resources and downlink communications (e.g., cli-RSSI-FDM-DL). One or more operations described herein may be based on or otherwise associated with the UE capability information transmitted by the UE 120. For example, the UE 120 may perform a communication in accordance with the UE capability information, or may receive configuration information that is in accordance with the UE capability information. In some aspects, the UE capability information may indicate that the UE 120 supports FDM of CLI measurement resources (e.g., UE-to-UE CLI measurement resources) and downlink communications. For example, the UE capability information may indicate that the UE 120 supports FDM of SRS-RSRP measurement resources and downlink communications (e.g., cli-SRS-FDM-DL) and/or FDM of CLI-RSSI measurement resources and downlink communications (e.g., cli-RSSI-FDM-DL).

In some aspects, the UE capability information may indicate a capability of the UE 120 to support RE-level and/or RB-level CLI resource (e.g., UE-to-UE CLI measurement resource) rate matching for PDSCH. For example, the UE capability information may indicate that the UE 120 supports RE-level and/or RB-level CLI resource (e.g., UE-to-UE CLI measurement resource) rate matching for PDSCH.

As further shown in FIG. 9A, and by reference number 910, the network node 110 may transmit, and the UE 120 may receive, configuration information indicating UE-to-UE CLI measurement resources and a downlink muting pattern associated with the UE-to-UE CLI measurement resources. For example, the configuration information may be included in one or more RRC messages, one or more MAC-CEs, or DCI. In some aspects, the configuration information may indicate one or more UE-to-UE CLI measurement resources in which respective UE-to-UE CLI measurements are to be performed by the UE 120. For example, the UE-to-UE CLI measurement resources may be time and frequency resources on which the UE 120 is to perform UE-to-UE CLI measurements. In such examples, the UE 120 may be a victim UE configured to measure, in the UE-to-UE CLI measurement resources, UE-to-UE CLI (e.g., CLI-RSSI and/or SRS-RSRP) at the UE 120 caused by one or more aggressor UEs. In some aspects, the network node 110 may transmit, to the one or more aggressor UEs, configuration information that configures the one or more aggressor UEs to transmit a signal (for example, an uplink reference signal, such as an SRS) in the one or more CLI resources to be measured by the UE 120. In some examples, the UE-to-UE CLI measurement resources may include one or more CLI-RSSI measurement resources in which respective CLI-RSSI measurements are to be performed by the UE 120. Additionally, or alternatively, the UE-to-UE CLI measurement resources may include one or more SRS-RSRP measurement resources in which respective SRS-RSRP measurements are to be performed by the UE 120. In some aspects, the UE-to-UE CLI measurement resources may be periodic (e.g., for periodic UE-to-UE CLI measurement resources by the UE 120), semi-persistent (e.g., for semi-persistent UE-to-UE CLI measurement resources by the UE 120), or aperiodic (e.g., for aperiodic UE-to-UE CLI measurement resources by the UE 120).

In some aspects, the configuration information may configure the UE 120 with one or more UE-to-UE CLI measurement resources in at least one downlink sub-band of one or more SBFD symbols. In such examples, the one or more UE-to-UE CLI measurements to be performed by the UE 120 may be measurements of inter-SB leakage (e.g., inter-SB intra-cell UE-to-UE CLI and/or inter-SB inter-cell UE-to-UE CLI). Additionally, or alternatively, the configuration information may configure the UE 120 with one or more UE-to-UE CLI measurement resources in one or more downlink symbols. In such examples, the one or more UE-to-UE CLI measurements to be performed by the UE 120 may be measurements of inter-SB inter-cell UE-to-UE CLI. In some aspects, the configuration information may include a configuration of a measurement report to be transmitted by the UE 120 to report the results of the UE-to-UE CLI measurements performed by the UE 120.

The configuration information may indicate a downlink muting pattern associated with the one or more UE-to-UE CLI measurement resources configured for the UE 120. In some aspects, the configuration information may indicate the downlink muting pattern associated with the one or more UE-to-UE CLI measurement resources configured for the UE 120 based at least in part on the UE 120 (e.g., the UE 120 configured to perform the one or more UE-to-UE CLI measurements) supporting FDM of UE-to-UE CLI measurement resources and downlink communications (e.g., the UE 120 supporting cli-SRS-FDM-DL and/or cli-RSSI-FDM-DL). The downlink muting pattern may indicate resources in which downlink communications/signaling from the network node 110 is to be muted (e.g., resources in which the network node 110 will refrain from transmitting downlink communications). In some aspects, the downlink muting pattern may indicate resources that correspond to the one or more UE-to-UE CLI measurement resources. That is, the downlink muting pattern may indicate that downlink communications are to be muted in the one or more UE-to-UE CLI measurement resources. In some aspects, the downlink muting pattern may indicate a rate matching pattern for downlink communications (e.g., a pattern of resources to be rate-matched around by the UE 120 when receiving downlink communications). For example, the downlink muting pattern may indicate a rate matching pattern for PDSCH. Accordingly, the downlink muting pattern may also be referred to as a rate matching pattern.

In some aspects, the configuration information may indicate an RE-level downlink muting pattern or an RB-level downlink muting pattern. That is, the muting pattern indicated in the configuration information may indicate resources in which downlink communications will be muted at an RE level or at an RB level. In such examples, the downlink muting pattern may indicate an RE-level or RB-level UE-to-UE CLI measurement resource rate matching pattern for PDSCH communications received in the one or more symbols in which the one or more UE-to-UE CLI measurement resources are configured. In such examples, the RE-level or RB-level downlink muting pattern (or rate matching pattern) RE-level or RB-level UE-to-UE CLI measurement resource rate matching pattern may be included in a list (e.g., in a wireless communication standard) of rate matching patterns that can be used to configure the UE 120 to perform rate matching (e.g., for PDSCH rate matching with an RB symbol level granularity and/or for PDSCH rate matching with an RE level granularity). In some aspects, the configuration information may indicate the RE-level or RB-level muting pattern based at least in part on the UE capability information indicating that the UE 120 supports RE-level or RB-level CLI resource (e.g., UE-to-UE CLI measurement resource) rate matching for PDSCH.

FIG. 9B shows examples 960 and 965 of downlink muting patterns in a downlink sub-band in one or more SBFD symbols (e.g., in an SBFD slot). In examples 960 and 965, the downlink muting patterns correspond to the UE-to-UE CLI measurement resources 962 configured in the downlink sub-band in the one or more SBFD symbols. That is, in examples 960 and 965, the downlink muting patterns indicate muting of downlink communications in the configured the UE-to-UE CLI measurement resources 962. For example, as shown in examples 960 and 965, in the SBFD symbols in which the UE-to-UE CLI measurement resources 962 are configured in the downlink sub-band, downlink (e.g., PDSCH) communications are muted in the frequencies configured for the UE-to-UE CLI measurement resources 962, but not downlink (e.g., PDSCH) communications are not muted (e.g., are permitted) in PDSCH resources 964 configured at different frequencies from the UE-to-UE CLI measurement resources 962.

As shown in example 960, in some aspects, the UE-to-UE CLI measurement resources 962 may include contiguous resources with a fine granularity (e.g., a PRB-level granularity) to allow/enable FDM of the UE-to-UE CLI measurement resources 962 with the PDSCH resources 964 in the one or more SBFD symbols. For example, the UE-to-UE CLI measurement resources 962 configured in the configuration information may include one or more groups of contiguous PRBs (e.g., or one or more sets of one or more contiguous PRBs).

As shown in example 965, in some aspects, the UE-to-UE CLI measurement resources 962 may be defined (e.g., configured in the configuration information) as a non-contiguous RE-level pattern or non-contiguous RB-level pattern. For example, the UE-to-UE CLI measurement resources 962 may include (e.g., be configured as) a pattern of non-contiguous REs or non-contiguous RBs. In some examples, the UE-to-UE CLI measurement resources 962 may be configured as an RE-level comb pattern. In such examples in which the UE-to-UE CLI measurement resources 962 are configured as a non-contiguous RE-level or RB-level pattern, the downlink muting pattern may configure the UE 120 to perform RE-level and/or RB-level downlink rate matching. For example, the frequency resources of the UE-to-UE CLI measurement resources 962 may be considered (or declared) as resources that are not available for PDSCH (e.g., not available for PDSCH reception by the UE 120 in the symbols in which the UE-to-UE CLI measurement resources 962 are configured). That is, PDSCH is to be rate-matched around the frequency resources of the UE-to-UE CLI measurement resources 962 in the symbols in which the UE-to-UE CLI measurement resources 962 are configured.

In some examples in which the one or more UE-to-UE CLI measurement resources are configured as a non-contiguous RE-level or RB-level pattern (e.g., as shown in example 965), the frequency resources indicated by the one or more UE-to-UE CLI measurement resources may be included in a list (e.g., in a wireless communication standard) of higher layer parameters indicating REs declared as not available for PDSCH that can be used to configure a UE for PDSCH resource mapping (e.g., PDSCH rate matching) with an RB symbol level granularity. Additionally, or alternatively, a list (e.g., in a wireless communication standard) of higher layer parameters that can be used to configure a UE for PDSCH resource mapping (e.g., PDSCH rate mapping) with an RE level granularity may indicate that the REs indicated by the UE-to-UE CLI measurement resources are declared not available for PDSCH.

Returning to FIG. 9A, in some aspects, the downlink muting pattern may be configured (e.g., in the configuration information) as a periodic downlink muting pattern (e.g., corresponding to periodic UE-to-UE CLI measurement resources), a semi-persistent downlink muting pattern (e.g., corresponding to semi-persistent UE-to-UE CLI measurement resources), or a dynamic downlink muting pattern (e.g., corresponding to dynamic UE-to-UE CLI measurement resources). In some aspects, the downlink muting pattern may be semi-statically configured (e.g., via RRC signaling). In such examples, additional dynamic signaling may be used to enable/disable the UE-to-UE CLI measurement resource rate matching for downlink communications in accordance with the downlink muting pattern, to activate/deactivate a semi-static downlink muting pattern, or to triggering an aperiodic downlink muting pattern. In some aspects, the downlink muting pattern may be explicitly configured in the configuration information (e.g., via RRC signaling). For example, the configuration information may include an explicit configuration of the downlink muting pattern. In some aspects, the configuration information may include a configuration of frequency resources for the one or more UE-to-UE CLI measurement resources, and the configuration of the frequency resources for the one or more UE-to-UE CLI measurement resources may indicate (e.g., implicitly indicate) the downlink muting pattern. For example, the UE 120 may implicitly determine the downlink muting pattern from the configuration of the frequency resources of the one or more UE-to-UE CLI measurement resources. In some aspects, the network node 110 may transmit the configuration information indicating (e.g., explicitly or implicitly) to the UE 120 and one or more other UEs, to configure UEs in the serving cell other than the UE 120 (e.g., the UE 120 configured to perform the UE-to-UE CLI measurements) to perform rate matching in accordance with the downlink muting pattern.

In some aspects, the configuration information may indicate one or more candidate configurations and/or communication parameters. In some aspects, the one or more candidate configurations and/or communication parameters may be selected, activated, and/or deactivated by a subsequent indication (e.g., the subsequent indication discussed in connection with reference number 915). For example, the subsequent indication may select a candidate configuration and/or communication parameter from the one or more candidate configurations and/or communication parameters. In some aspects, the subsequent indication may include a dynamic indication, such as one or more MAC-CEs and/or one or more DCI messages, among other examples.

As further shown in FIG. 9A, and by reference number 915, in some aspects, the network node 110 may transmit, and the UE 120 may receive a dynamic indication associated with the downlink muting pattern. For example, the dynamic indication may be included in DCI or a MAC-CE. In some aspects, the dynamic indication may include dynamic signaling (e.g., via DCI) to enable or disable rate matching in accordance with the downlink muting pattern (e.g., rate matching around the one or more UE-to-UE CLI measurement resources for PDSCH). For example, the dynamic indication may be transmitted via a DCI format (e.g., a network entity DCI format) for enabling or disabling rate matching around UE-to-UE CLI measurement resources.

In some aspects, in a case in which the downlink muting pattern is a semi-static downlink muting pattern, the dynamic indication may include dynamic signaling (e.g., via a MAC-CE) activating (or deactivating) the semi-static downlink muting pattern. Additionally, or alternatively, the dynamic indication may include dynamic signaling (e.g., via a MAC-CE) activating (or deactivating) semi-static UE-to-UE CLI measurement resources.

In some aspects, in a case in which the downlink muting pattern is an aperiodic downlink muting pattern, the dynamic indication may include dynamic signaling (e.g., via DCI) triggering the dynamic downlink muting pattern. Additionally, or alternatively, the dynamic indication may include dynamic signaling (e.g., via DCI) triggering aperiodic UE-to-UE CLI measurement resources.

As further shown in FIG. 9A, and by reference number 920, the UE 120 may perform one or more UE-to-UE CLI measurements in the one or more UE-to-UE CLI measurement resources indicated in the configuration information. For example, the UE 120 may perform the one or more UE-to-UE CLI measurements in at least one downlink sub-band of one or more SBFD symbols. Additionally, or alternatively, the UE 120 may perform the one or more UE-to-UE CLI measurements in one or more downlink symbols. In some aspects, the one or more UE-to-UE CLI measurements may include one or more CLI-RSSI measurements and/or one or more SRS-RSRP measurements. Additionally, or alternatively, the one or more UE-to-UE CLI measurements may include measurements of other CLI metrics (e.g., CLI SINR, among other examples). The UE 120 may perform the UE-to-UE CLI measurements (e.g., measure the CLI-RSSI, SRS-RSRP, and/or one or more other CLI metrics) based at least in part on a signal (e.g., an uplink reference signal, such as an SRS) transmitted by one or more other UEs (e.g., one or more aggressor UEs) in the one or more UE-to-UE CLI measurement resources. In some aspects, the UE 120 may use downlink timing for the one or more UE-to-UE CLI measurements, and downlink and/or uplink communications may not be muted or restricted in one or more symbols that immediately precede the one or more symbols in which the one or more UE-to-UE CLI measurements are performed, as discussed above in connection with reference number 815 of FIG. 8.

As further shown in FIG. 9A, and by reference number 925, the network node 110 may perform downlink muting in accordance with the downlink muting pattern. In some aspects, in accordance with the downlink muting pattern, the network node 110 may refrain from transmitting downlink communications in the frequency resources of the one or more UE-to-UE CLI measurement resources in the one or more symbols in which the one or more UE-to-UE CLI measurements are being performed by the UE 120. For example, the frequency resources of the one or more UE-to-UE CLI measurement resources may be not available for PDSCH transmission by the network node 110 in the one or more symbols in which the one or more UE-to-UE CLI measurements are being performed. In some aspects, in accordance with the downlink muting pattern, the network node 110 may be permitted to transmit downlink (e.g., PDSCH) communications in frequency resources other than the frequency resources of the one or more UE-to-UE CLI measurements in the one or more symbols in which the one or more UE-to-UE CLI measurements are being performed. For example, the network node 110 may transmit one or more downlink (e.g., PDSCH) communications to the UE 120 and/or one or more other UEs in the serving cell of the network node 110 in frequency resources other than the frequency resources of the one or more UE-to-UE CLI measurement resources in the one or more symbols in which the one or more UE-to-UE CLI measurements are being performed.

As further shown in FIG. 9A, and by reference number 930, the UE 120 may perform rate matching in accordance with the downlink muting pattern. In some aspects, the UE 120 may perform rate matching around the one or more CLI measurement resources for at least one downlink (e.g., PDSCH) communication received by the UE 120 in the one or more symbols in which the UE-to-UE CLI measurements are performed by the UE 120, in accordance with the downlink muting pattern (e.g., the RE-level or RB-level downlink muting pattern). For example, the at least one downlink (e.g., PDSCH) communication may be transmitted to the UE 120 from the network node 110 in frequency resources other than the frequency resources of the one or more UE-to-UE CLI measurement resources in the one or more symbols in which the one or more UE-to-UE CLI measurements are being performed. In an example in which the one or more UE-to-UE CLI measurement resources are performed in at least one downlink sub-band of one or more SBFD symbols, the UE 120 may perform rate matching around the one or more UE-to-UE CLI measurement resources for at least one downlink communication received in the at least one downlink sub-band in the one or more SBFD symbols in accordance with the downlink muting pattern (e.g., the RE-level or RB-level downlink muting pattern). For example, the at least one downlink communication may be transmitted by the network node 110 in frequency resources other than the frequency resources of the one or more UE-to-UE CLI measurement resources in the at least one downlink sub-band in the one or more SBFD symbols.

As further shown in FIG. 9A, and by reference number 935, the UE 120 may transmit, and the network node 110 may receive, a measurement report that includes the results of the one or more UE-to-UE CLI measurements performed by the UE 120. For example, the measurement report may include one or more CLI-RSSI values measured by the UE 120 and/or one or more SRS-RSRP values measured by the UE 120. Additionally, or alternatively, the measurement report may include one or more values for one or more other CLI metrics (e.g., CLI SINR) measured by the UE 120. The UE 120 may transmit the measurement report in accordance with the configuration of the measurement report indicated in the configuration information. In some aspects, the UE 120 may transmit the measurement report via PUCCH or PUSCH resources.

As further shown in FIG. 9A, and by reference number 940, in some aspects, the network node 110 may perform CLI mitigation. For example, the network node 110 may apply a CLI mitigation mechanism to reduce UE-to-UE CLI on one or more downlink communications scheduled for the UE 120. The network node 110 may perform CLI mitigation based at least in part on the measurement report received from the UE 120, as discussed above in connection with reference number 825 of FIG. 8.

In some aspects, the operations discussed in connection with FIGS. 9A-9B may be performed in combination with the operations discussed in connection FIG. 8 by the network node 110 and UEs (e.g., the UE 120 and one or more other UEs) in a serving cell of the network node 110. For example, the operations discussed in connection with FIG. 8 may be used when the network node 110 configures UE-to-UE CLI measurements to be performed by a UE 120 that does not support FDM of UE-to-UE CLI measurement resources and downlink communications (e.g., a UE 120 that does not support cli-SRS-FDM-DL and/or cli-RSSI-FDM-DL), and the operations discussed in connection FIGS. 9A-9B may be used when the network node 110 configures UE-to-UE CLI measurements to be performed by a UE 120 that supports FDM of UE-to-UE CLI measurement resources and downlink communications (e.g., a UE 120 that supports cli-SRS-FDM-DL and/or cli-RSSI-FDM-DL).

As indicated above, FIGS. 9A-9B are provided as an example. Other examples may differ from what is described with respect to FIGS. 9A-9B.

Figure 10:
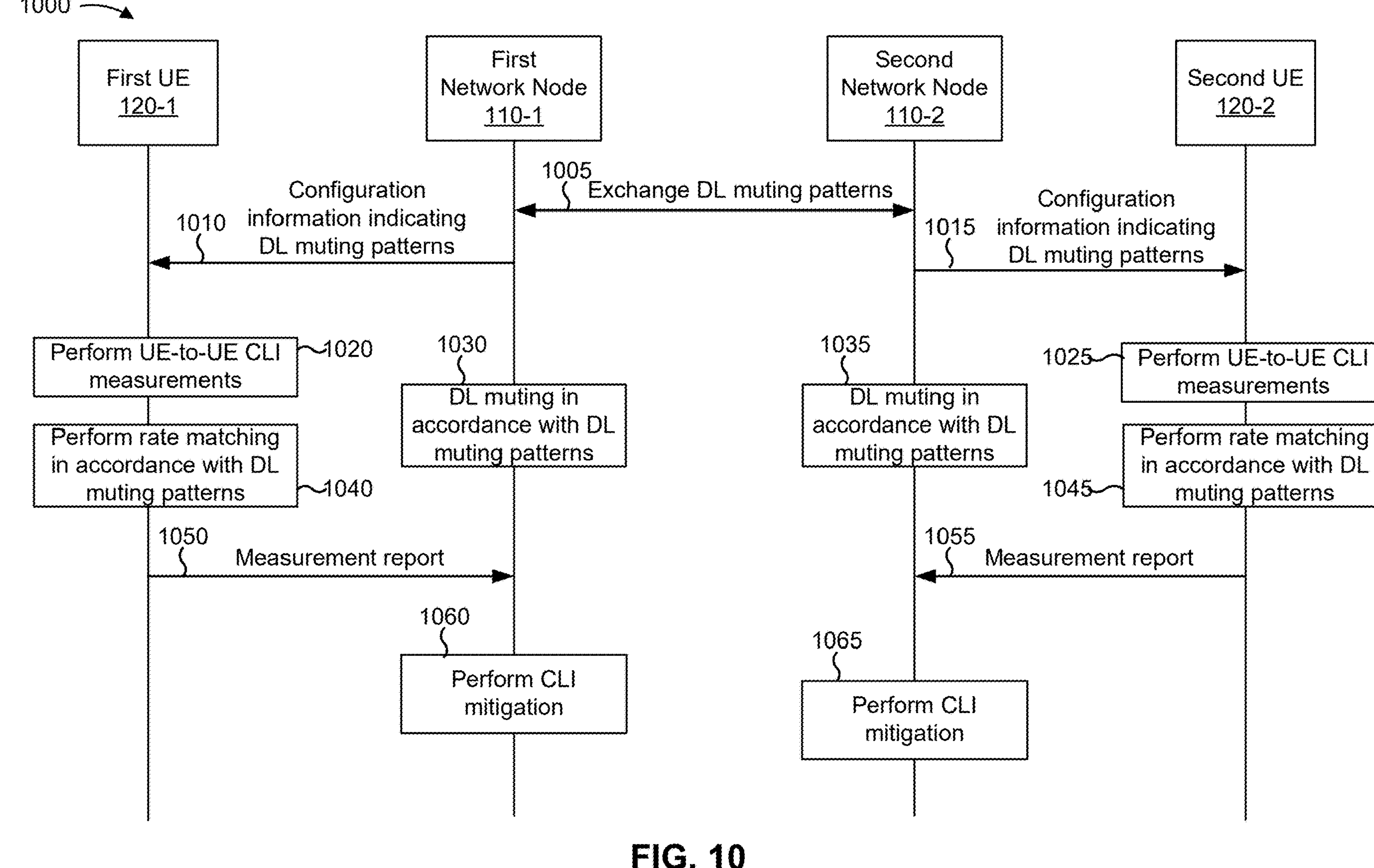
FIG. 10 is a diagram illustrating an example associated with downlink muting in a serving cell and a neighbor cell for inter-UE CLI measurements, in accordance with the present disclosure.

FIG. 10 is a diagram illustrating an example 1000 associated with downlink muting in a serving cell and a neighbor cell for inter-UE CLI measurements, in accordance with the present disclosure. As shown in FIG. 10, example 1000 a first network node 110-1, a second network node 110-2, a first UE 120-1, and a second UE 120-2. The first network node 110-1 and the second network node 110-2 may be neighbor network nodes associated with neighboring serving cells. The first UE 120-1 may be in a serving cell of the first network node 110-1, and the second UE 120-2 may be in the serving cell of the second network node 110-2.

As shown in FIG. 10, and by reference number 1005, the first network node 110-1 and the second network node 110-2 may exchange downlink muting patterns. For example, the first network node 110-1 may provide (e.g., transmit), and the second network node 110-2 may obtain (e.g., receive), a first downlink muting pattern associated with the first network node 110-1. The first downlink muting pattern may be associated with one or more one or more UE-to-UE CLI measurement resources for UE-to-UE CLI measurements to be performed by the first UE 120-1 (e.g., in one or more downlink symbols and/or in at least one downlink sub-band in one or more SBFD symbols). In some aspects, the first downlink muting pattern may be similar to the downlink muting pattern discussed in connection with FIGS. 9A-9B. In some examples, the first downlink muting pattern may be a periodic downlink muting pattern. In some examples, the first downlink muting pattern may be an RE-level downlink muting pattern (e.g., to save/efficiently allocate resources in which downlink muting is performed). In some examples, the first downlink muting pattern may include groups/sets of a number (e.g., one or more) of RBs. For example, the first downlink muting pattern can included contiguous RBs with a PRB level granularity. In some examples, the first downlink muting pattern may be a pattern of non-contiguous REs or non-contiguous RBs.

The second network node 110-2 may provide (e.g., transmit), and the first network node 110-1 may obtain (e.g., receive), a second downlink muting pattern associated with the second network node 110-2. The second downlink muting pattern may be associated with one or more one or more UE-to-UE CLI measurement resources for UE-to-UE CLI measurements to be performed by the second UE 120-2 (e.g., in one or more downlink symbols and/or in at least one downlink sub-band in one or more SBFD symbols). In some aspects, the second downlink muting pattern may be similar to the downlink muting pattern discussed in connection with FIGS. 9A-9B. In some examples, the second downlink muting pattern may be a periodic downlink muting pattern. In some examples, the second downlink muting pattern may be an RE-level downlink muting pattern (e.g., to save/efficiently allocate resources in which downlink muting is performed). In some examples, the second downlink muting pattern may include groups/sets of a number (e.g., one or more) of RBs. For example, the second downlink muting pattern can included contiguous RBs with a PRB level granularity. In some examples, the second downlink muting pattern may be a pattern of non-contiguous REs or non-contiguous RBs.

In some aspects, the first network node 110-1 and the second network node 110-2 may exchange the downlink muting patterns (e.g., the first and second downlink muting patterns) via backhaul signaling or via OTA signaling. In some aspects, the second network node 110-2 may exchange the downlink muting patterns (e.g., the first and second downlink muting patterns) via communications with one or more other network nodes, such as one or more CUs, one or more network controllers, and/or network entities.

As further shown in FIG. 10, and by reference number 1010, the first network node 110-1 may transmit, and the first UE 120-1 may receive, configuration information indicating the downlink muting patterns (e.g., the first downlink muting pattern associated with downlink muting in the serving cell of the first network node 110-1 and the second downlink muting pattern associated with the neighboring serving cell of the second network node 110-2). The configuration information may also indicate one or more UE-to-UE CLI measurement resources in one or more downlink symbols and/or in at least one downlink sub-band of one or more SBFD symbols. The configuration may indicate the first downlink muting pattern and the second downlink muting pattern similar to as discussed above in connection with reference number 910 of FIG. 9A.

As shown by reference number 1015, the second network node 110-2 may transmit, and the second UE 120-2 may receive, configuration information indicating the downlink muting patterns (e.g., the second downlink muting pattern associated with downlink muting in the serving cell of the second network node 110-2 and the first downlink muting pattern associated with the neighboring serving cell of the first network node 110-1). The configuration information may also indicate one or more UE-to-UE CLI measurement resources in one or more downlink symbols and/or in at least one downlink sub-band of one or more SBFD symbols. The configuration may indicate the second downlink muting pattern and the first downlink muting pattern similar to as discussed above in connection with reference number 910 of FIG. 9A.

As shown by reference number 1020, the first UE 120-1 may perform UE-to-UE CLI measurements, for example, as discussed above in connection with reference number 920 of FIG. 9 and/or reference number 815 of FIG. 8. As shown by reference number 1025, the second UE 120-2 may perform UE-to-UE CLI measurements, for example, as discussed above in connection with reference number 920 of FIG. 9 and/or reference number 815 of FIG. 8.

As shown by reference number 1030, the first network node 110-1 may perform downlink muting in accordance with the first downlink muting pattern and the second downlink muting pattern. The first network node 110-1, in accordance with the first downlink muting pattern, may refrain from transmitting downlink communications in the frequency resources of the UE-to-UE CLI measurement resources configured for the UE-to-UE CLI measurements performed by the first UE 120-1 in the serving cell of the first network node 110-1 in the one or more symbols in which the UE-to-UE CLI measurements are being performed by the first UE 120-1, as discussed above in connection with reference number 925 of FIG. 9A. In some aspects, the first network node 110-1, in accordance with the second downlink muting pattern, may also refrain from transmitting downlink communications in the frequency resources of the UE-to-UE CLI measurement resources configured for the UE-to-UE CLI measurements performed by the second UE 120-2 in the neighboring serving cell in the one or more symbols in which the UE-to-UE CLI measurements are being performed by the second UE 120-2. In this way, downlink communications/signals from the first network node 110-1 may be muted for the UE-to-UE CLI measurements performed by the second UE 120-2 in the neighboring serving cell, resulting in improved accuracy for the UE-to-UE CLI measurements performed by the second UE 120-2.

As shown by reference number 1035, the second network node 110-2 the network node 110 may perform downlink muting in accordance with the second downlink muting pattern and the first downlink muting pattern. The second network node 110-2, in accordance with the second downlink muting pattern, may refrain from transmitting downlink communications in the frequency resources of the UE-to-UE CLI measurement resources configured for the UE-to-UE CLI measurements performed by the second UE 120-2 in the serving cell of the second network node 110-2 in the one or more symbols in which the UE-to-UE CLI measurements are being performed by the second UE 120-2, as discussed above in connection with reference number 925 of FIG. 9A. In some aspects, the second network node 110-2, in accordance with the first downlink muting pattern, may also refrain from transmitting downlink communications in the frequency resources of the UE-to-UE CLI measurement resources configured for the UE-to-UE CLI measurements performed by the first UE 120-1 in the neighboring serving cell in the one or more symbols in which the UE-to-UE CLI measurements are being performed by the first UE 120-1. In this way, downlink communications/signals from the second network node 110-1 may be muted for the UE-to-UE CLI measurements performed by the first UE 120-1 in the neighboring serving cell, resulting in improved accuracy for the UE-to-UE CLI measurements performed by the first UE 120-1.

As further shown in FIG. 10, and by reference number 1040, the first UE 120-1 may perform rate matching in accordance with the first downlink muting pattern and in accordance with the second downlink muting pattern. For example, the first UE 120-1, in accordance with the first downlink muting pattern, may rate match around the UE-to-UE CLI measurement resources configured for the UE-to-UE CLI measurements performed by the first UE 120-1 for a downlink communication received from the first network node 110-1 in the one or more symbols in which the UE-to-UE CLI measurements are performed by the first UE 120-1. Additionally, or alternatively, the first UE 120-1, in accordance with the second downlink muting pattern, may rate match around the UE-to-UE CLI measurement resources configured for the UE-to-UE CLI measurements performed by the second UE 120-2 for a downlink communication received from the first network node 110-1 in the one or more symbols in which the UE-to-UE CLI measurements are performed by the second UE 120-2.

As shown by reference number 1045, the second UE 120-2 may perform rate matching in accordance with the second downlink muting pattern and in accordance with the first downlink muting pattern. For example, the second UE 120-2, in accordance with the second downlink muting pattern, may rate match around the UE-to-UE CLI measurement resources configured for the UE-to-UE CLI measurements performed by the second UE 120-2 for a downlink communication received from the second network node 110-2 in the one or more symbols in which the UE-to-UE CLI measurements are performed by the second UE 120-2. Additionally, or alternatively, the second UE 120-2, in accordance with the first downlink muting pattern, may rate match around the UE-to-UE CLI measurement resources configured for the UE-to-UE CLI measurements performed by the first UE 120-1 for a downlink communication received from the second network node 110-2 in the one or more symbols in which the UE-to-UE CLI measurements are performed by the first UE 120-1.

As further shown in FIG. 10, and by reference number 1050, the first UE 120-1 may transmit, and the first network node 110-1 may receive, a measurement report that includes the results of the one or more UE-to-UE CLI measurements performed by the first UE 120-1, for example, as discussed above in connection with reference number 935 of FIG. 9A and/or reference number 820 of FIG. 8.

As shown by reference number 1055, second first UE 120-2 may transmit, and the second network node 110-2 may receive, a measurement report that includes the results of the one or more UE-to-UE CLI measurements performed by the second UE 120-2, for example, as discussed above in connection with reference number 935 of FIG. 9A and/or reference number 820 of FIG. 8.

As shown by reference number 1060, the first network node 110-1 may perform CLI mitigation. For example, the first network node 110-1 may apply a CLI mitigation mechanism to reduce UE-to-UE CLI on one or more downlink communications scheduled for the first UE 120-1. The first network node 110-1 may perform CLI mitigation based at least in part on the measurement report received from the first UE 120-1, for example, as discussed above in connection with reference number 825 of FIG. 8 and/or reference number 940 of FIG. 9A.

As shown by reference number 1065, the second network node 110-2 may perform CLI mitigation. For example, the second network node 110-2 may apply a CLI mitigation mechanism to reduce UE-to-UE CLI on one or more downlink communications scheduled for the second UE 120-2. The second network node 110-2 may perform CLI mitigation based at least in part on the measurement report received from the second UE 120-2, for example, as discussed above in connection with reference number 825 of FIG. 8 and/or reference number 940 of FIG. 9A.

As indicated above, FIG. 10 is provided as an example. Other examples may differ from what is described with respect to FIG. 10.

Figure 11:
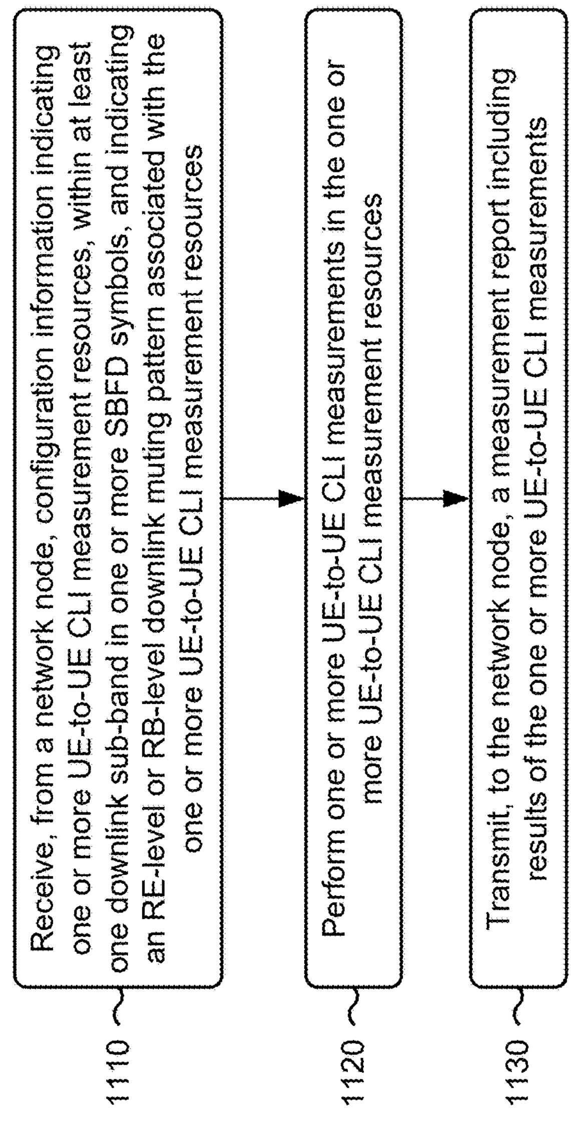
FIG. 11 is a diagram illustrating an example process performed, for example, at a UE or an apparatus of a UE, in accordance with the present disclosure.

FIG. 11 is a diagram illustrating an example process 1100 performed, for example, at a UE or an apparatus of a UE, in accordance with the present disclosure. Example process 1100 is an example where the apparatus or the UE (e.g., UE 120) performs operations associated with downlink muting for inter-UE CLI measurements.

As shown in FIG. 11, in some aspects, process 1100 may include receiving, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources (block 1110). For example, the UE (e.g., using reception component 1502 and/or communication manager 1506, depicted in FIG. 15) may receive, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources, as described above.

As further shown in FIG. 11, in some aspects, process 1100 may include performing one or more UE-to-UE CLI measurements in the one or more UE-to-UE CLI measurement resources (block 1120). For example, the UE (e.g., using communication manager 1506, depicted in FIG. 15) may perform one or more UE-to-UE CLI measurements in the one or more UE-to-UE CLI measurement resources, as described above.

As further shown in FIG. 11, in some aspects, process 1100 may include transmitting, to the network node, a measurement report including results of the one or more UE-to-UE CLI measurements (block 1130). For example, the UE (e.g., using transmission component 1504 and/or communication manager 1506, depicted in FIG. 15) may transmit, to the network node, a measurement report including results of the one or more UE-to-UE CLI measurements, as described above.

Process 1100 may include additional aspects, such as any single aspect or any combination of aspects described below and/or in connection with one or more other processes described elsewhere herein.

In a first aspect, process 1100 includes performing rate-matching around the one or more UE-to-UE CLI measurement resources for at least one downlink communication received in the at least one downlink sub-band in the one or more SBFD symbols in accordance with the RE-level or RB-level downlink muting pattern.

In a second aspect, alone or in combination with the first aspect, downlinking timing is used for the one or more UE-to-UE CLI measurements, and downlink communications are not muted in one or more other symbols that immediately precede the one or more SBFD symbols.

In a third aspect, alone or in combination with one or more of the first and second aspects, the downlink muting pattern is a periodic downlink muting pattern.

In a fourth aspect, alone or in combination with one or more of the first through third aspects, the downlink muting pattern is a semi-persistent downlink muting pattern.

In a fifth aspect, alone or in combination with one or more of the first through fourth aspects, process 1100 includes receiving dynamic signaling activating the semi-persistent downlink muting pattern.

In a sixth aspect, alone or in combination with one or more of the first through fifth aspects, the downlink muting pattern is a dynamic downlink muting pattern.

In a seventh aspect, alone or in combination with one or more of the first through sixth aspects, process 1100 includes receiving dynamic signaling triggering the dynamic downlink muting pattern.

In an eighth aspect, alone or in combination with one or more of the first through seventh aspects, the one or more UE-to-UE CLI measurement resources include a pattern of non-contiguous REs or non-contiguous RBs.

In a ninth aspect, alone or in combination with one or more of the first through eighth aspects, frequency resources of the one or more UE-to-UE CLI measurement resources are not available for PDSCH reception.

In a tenth aspect, alone or in combination with one or more of the first through ninth aspects, the one or more UE-to-UE CLI measurement resources include one or more contiguous PRBs.

In an eleventh aspect, alone or in combination with one or more of the first through tenth aspects, process 1100 includes transmitting, to the network node, UE capability information indicating a UE capability to support RE-level or RB-level UE-to-UE CLI measurement resource rate matching for PDSCH communications.

In a twelfth aspect, alone or in combination with one or more of the first through eleventh aspects, the configuration information includes an explicit configuration of the downlink muting pattern.

In a thirteenth aspect, alone or in combination with one or more of the first through twelfth aspects, the configuration information includes a configuration of frequency resources for the one or more UE-to-UE CLI measurement resources, and the configuration of the frequency resources for the one or more UE-to-UE CLI measurement resources indicates the downlink muting pattern.

In a fourteenth aspect, alone or in combination with one or more of the first through thirteenth aspects, process 1100 includes receiving dynamic signaling to enable or disable rate matching in accordance with the downlink muting pattern.

In a fifteenth aspect, alone or in combination with one or more of the first through fourteenth aspects, frequency resources of the one or more UE-to-UE CLI measurement resources are not available for PDSCH reception by the UE in the one or more SBFD symbols.

In a sixteenth aspect, alone or in combination with one or more of the first through fifteenth aspects, the configuration information indicates another downlink muting pattern associated with one or more neighboring cell UE-to-UE CLI measurements.

In a seventeenth aspect, alone or in combination with one or more of the first through sixteenth aspects, the one or more UE-to-UE CLI measurement resources include one or more CLI-RSSI measurement resources or one or more SRS-RSRP measurement resources.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
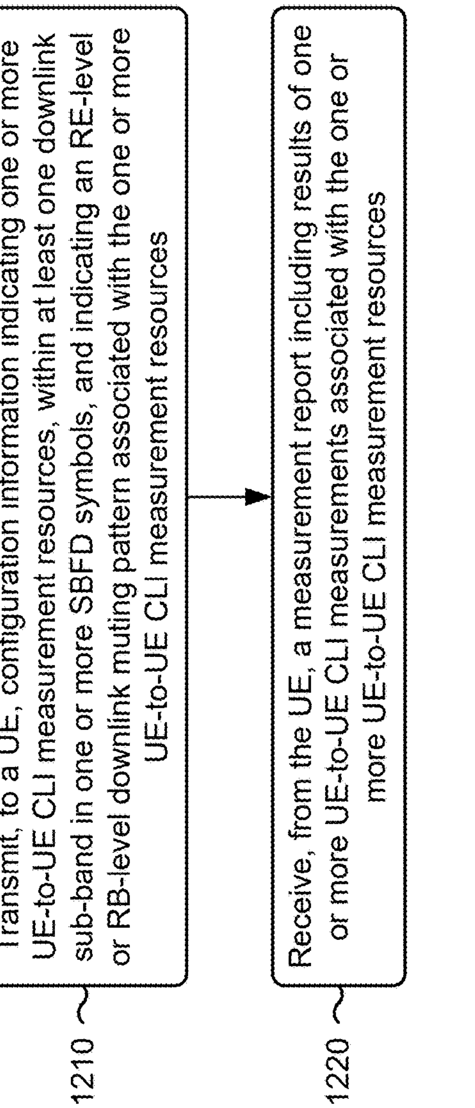
FIG. 12 is a diagram illustrating an example process performed, for example, at a network node or an apparatus of a network node, in accordance with the present disclosure.

FIG. 12 is a diagram illustrating an example process 1200 performed, for example, at a network node or an apparatus of a network node, in accordance with the present disclosure. Example process 1200 is an example where the apparatus or the network node (e.g., network node 110) performs operations associated with downlink muting for inter-UE CLI measurements.

As shown in FIG. 12, in some aspects, process 1200 may include transmitting, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources (block 1210). For example, the network node (e.g., using transmission component 1604 and/or communication manager 1606, depicted in FIG. 16) may transmit, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources, as described above.

As further shown in FIG. 12, in some aspects, process 1200 may include receiving, from the UE, a measurement report including results of one or more UE-to-UE CLI measurements associated with the one or more UE-to-UE CLI measurement resources (block 1220). For example, the network node (e.g., using reception component 1602 and/or communication manager 1606, depicted in FIG. 16) may receive, from the UE, a measurement report including results of one or more UE-to-UE CLI measurements associated with the one or more UE-to-UE CLI measurement resources, as described above.

Process 1200 may include additional aspects, such as any single aspect or any combination of aspects described below and/or in connection with one or more other processes described elsewhere herein.

In a first aspect, process 1200 includes refraining from transmitting downlink communications in frequency resources of the one or more CLI measurement resources in accordance with the downlink muting pattern.

In a second aspect, alone or in combination with the first aspect, downlinking timing is used for the one or more UE-to-UE CLI measurements, and downlink communications are not muted in one or more other symbols that immediately precede the one or more SBFD symbols.

In a third aspect, alone or in combination with one or more of the first and second aspects, the downlink muting pattern is a periodic downlink muting pattern.

In a fourth aspect, alone or in combination with one or more of the first through third aspects, the downlink muting pattern is a semi-persistent downlink muting pattern.

In a fifth aspect, alone or in combination with one or more of the first through fourth aspects, process 1200 includes transmitting dynamic signaling activating the semi-persistent downlink muting pattern.

In a sixth aspect, alone or in combination with one or more of the first through fifth aspects, the downlink muting pattern is a dynamic downlink muting pattern.

In a seventh aspect, alone or in combination with one or more of the first through sixth aspects, process 1200 includes transmitting dynamic signaling triggering the dynamic downlink muting pattern.

In an eighth aspect, alone or in combination with one or more of the first through seventh aspects, the one or more UE-to-UE CLI measurement resources include a pattern of non-contiguous REs or non-contiguous RBs.

In a ninth aspect, alone or in combination with one or more of the first through eighth aspects, frequency resources of the one or more UE-to-UE CLI measurement resources are not available for PDSCH transmission.

In a tenth aspect, alone or in combination with one or more of the first through ninth aspects, the one or more UE-to-UE CLI measurement resources include one or more contiguous PRBs.

In an eleventh aspect, alone or in combination with one or more of the first through tenth aspects, process 1200 includes receiving, from the UE, UE capability information indicating a UE capability to support RE-level or RB-level UE-to-UE CLI measurement resource rate matching for PDSCH communications.

In a twelfth aspect, alone or in combination with one or more of the first through eleventh aspects, the configuration information includes an explicit configuration of the downlink muting pattern.

In a thirteenth aspect, alone or in combination with one or more of the first through twelfth aspects, the configuration information includes a configuration of frequency resources for the one or more UE-to-UE CLI measurement resources, and the configuration of the frequency resources for the one or more UE-to-UE CLI measurement resources indicates the downlink muting pattern.

In a fourteenth aspect, alone or in combination with one or more of the first through thirteenth aspects, process 1200 includes transmitting dynamic signaling to enable or disable rate matching in accordance with the downlink muting pattern.

In a fifteenth aspect, alone or in combination with one or more of the first through fourteenth aspects, frequency resources of the one or more UE-to-UE CLI measurement resources are not available for PDSCH transmission by the network node in the one or more SBFD symbols.

In a sixteenth aspect, alone or in combination with one or more of the first through fifteenth aspects, the one or more UE-to-UE CLI measurement resources include one or more CLI-RSSI measurement resources or one or more SRS-RSRP measurement resources.

In a seventeenth aspect, alone or in combination with one or more of the first through sixteenth aspects, process 1200 includes transmitting, to another network node, an indication of the downlink muting pattern.

In an eighteenth aspect, alone or in combination with one or more of the first through seventeenth aspects, the downlink muting pattern is a periodic downlink muting pattern.

In a nineteenth aspect, alone or in combination with one or more of the first through eighteenth aspects, the downlink muting pattern is an RE-level downlink muting pattern.

In a twentieth aspect, alone or in combination with one or more of the first through nineteenth aspects, the downlink muting pattern includes one or more contiguous RBs.

In a twenty-first aspect, alone or in combination with one or more of the first through twentieth aspects, the downlink muting pattern is a pattern of non-contiguous REs or non-contiguous RBs.

In a twenty-second aspect, alone or in combination with one or more of the first through twenty-first aspects, process 1200 includes receiving, from another network node, an indication of another downlink muting pattern associated with one or more neighboring cell UE-to-UE CLI measurements.

In a twenty-third aspect, alone or in combination with one or more of the first through twenty-second aspects, the configuration information indicates the other downlink muting pattern associated with the one or more neighboring cell UE-to-UE CLI measurements.

In a twenty-fourth aspect, alone or in combination with one or more of the first through twenty-third aspects, the other downlink muting pattern is a periodic downlink muting pattern.

In a twenty-fifth aspect, alone or in combination with one or more of the first through twenty-fourth aspects, the other downlink muting pattern is an RE-level downlink muting pattern.

In a twenty-sixth aspect, alone or in combination with one or more of the first through twenty-fifth aspects, the other downlink muting pattern includes one or more contiguous RBs.

In a twenty-seventh aspect, alone or in combination with one or more of the first through twenty-sixth aspects, the other downlink muting pattern is a pattern of non-contiguous REs or non-contiguous RBs.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
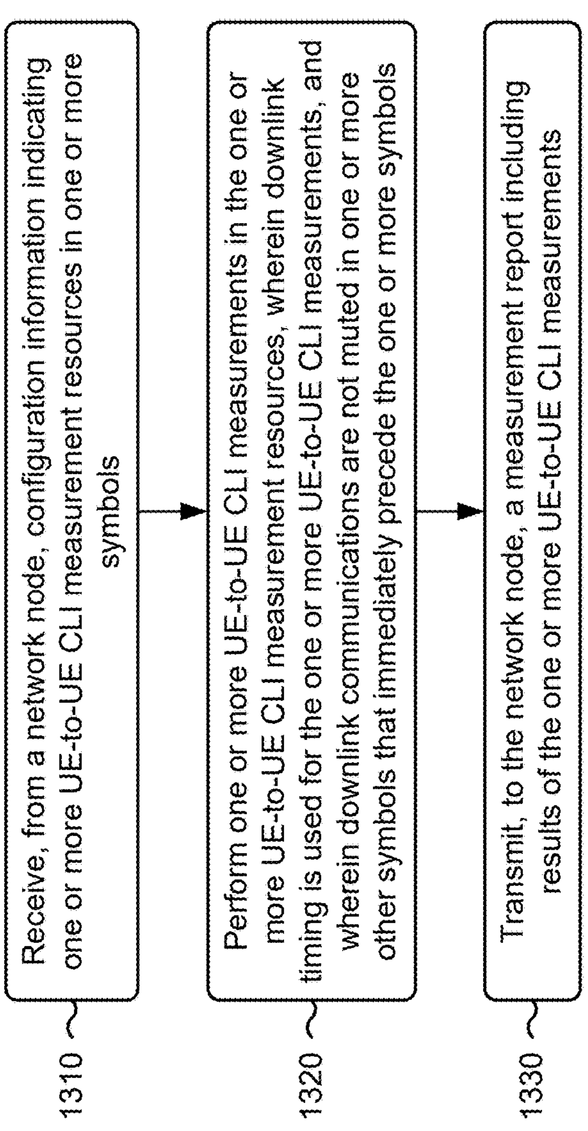
FIG. 13 is a diagram illustrating an example process performed, for example, at a UE or an apparatus of a UE, in accordance with the present disclosure.

FIG. 13 is a diagram illustrating an example process 1300 performed, for example, at a UE or an apparatus of a UE, in accordance with the present disclosure. Example process 1300 is an example where the apparatus or the UE (e.g., UE 120) performs operations associated with CLI measurements using downlink timing.

As shown in FIG. 13, in some aspects, process 1300 may include receiving, from a network node, configuration information indicating one or more UE-to-UE CLI measurement resources in one or more symbols (block 1310). For example, the UE (e.g., using reception component 1502 and/or communication manager 1506, depicted in FIG. 15) may receive, from a network node, configuration information indicating one or more UE-to-UE CLI measurement resources in one or more symbols, as described above.

As further shown in FIG. 13, in some aspects, process 1300 may include performing one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols (block 1320). For example, the UE (e.g., using communication manager 1506, depicted in FIG. 15) may perform one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols, as described above.

As further shown in FIG. 13, in some aspects, process 1300 may include transmitting, to the network node, a measurement report including results of the one or more UE-to-UE CLI measurements (block 1330). For example, the UE (e.g., using transmission component 1504 and/or communication manager 1506, depicted in FIG. 15) may transmit, to the network node, a measurement report including results of the one or more UE-to-UE CLI measurements, as described above.

Process 1300 may include additional aspects, such as any single aspect or any combination of aspects described below and/or in connection with one or more other processes described elsewhere herein.

In a first aspect, the one or more UE-to-UE CLI measurement resources include one or more CLI-RSSI measurement resources or one or more SRS-RSRP measurement resources.

In a second aspect, alone or in combination with the first aspect, the one or more symbols include one or more SBFD symbols, and the UE-to-UE CLI measurement resources are within at least one downlink sub-band of the one or more SBFD symbols.

In a third aspect, alone or in combination with one or more of the first and second aspects, downlinking communications are not muted in two consecutive symbols that immediately precede the one or more symbols.

In a fourth aspect, alone or in combination with one or more of the first through third aspects, process 1300 includes transmitting, to the network node, UE capability information indicating whether the UE supports frequency division multiplexing of UE-to-UE CLI measurement resources and downlink communications.

In a fifth aspect, alone or in combination with one or more of the first through fourth aspects, process 1300 includes receiving a downlink communication in the one or more other symbols that immediately precede the one or more symbols.

In a sixth aspect, alone or in combination with one or more of the first through fifth aspects, uplink communications are not restricted in the one or more other symbols that immediately precede the one or more symbols.

In a seventh aspect, alone or in combination with one or more of the first through sixth aspects, process 1300 includes transmitting an uplink communication in the one or more other symbols that immediately precede the one or more symbols.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
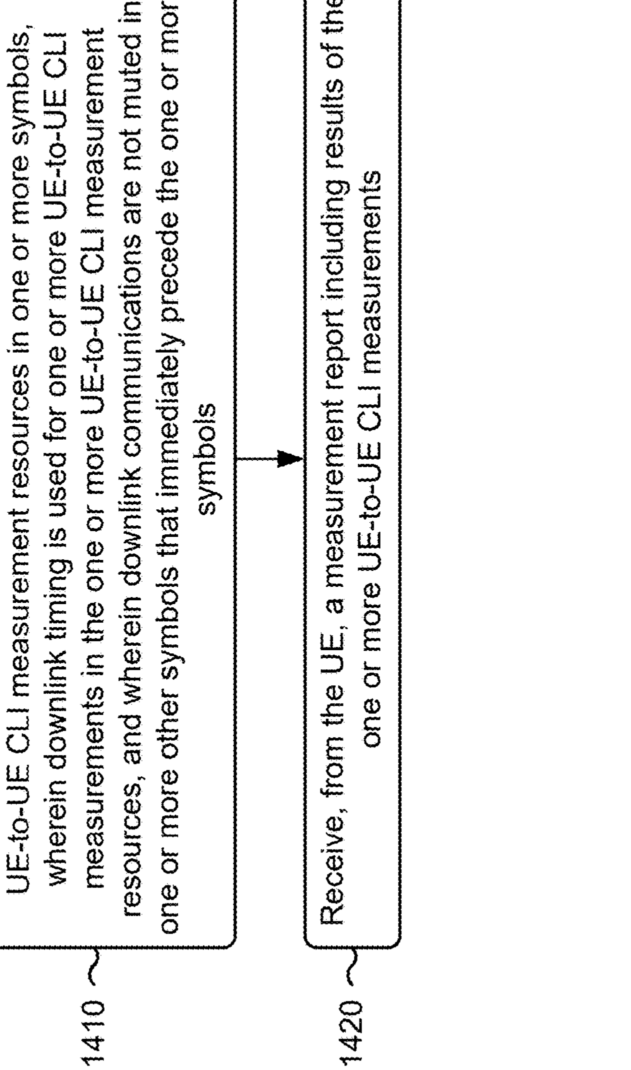
FIG. 14 is a diagram illustrating an example process performed, for example, at a network node or an apparatus of a network node, in accordance with the present disclosure.

FIG. 14 is a diagram illustrating an example process 1400 performed, for example, at a network node or an apparatus of a network node, in accordance with the present disclosure. Example process 1400 is an example where the apparatus or the network node (e.g., network node 110) performs operations associated with CLI measurements using downlink timing.

As shown in FIG. 14, in some aspects, process 1400 may include transmitting, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols (block 1410). For example, the network node (e.g., using transmission component 1604 and/or communication manager 1606, depicted in FIG. 16) may transmit, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols, as described above.

As further shown in FIG. 14, in some aspects, process 1400 may include receiving, from the UE, a measurement report including results of the one or more UE-to-UE CLI measurements (block 1420). For example, the network node (e.g., using reception component 1602 and/or communication manager 1606, depicted in FIG. 16) may receive, from the UE, a measurement report including results of the one or more UE-to-UE CLI measurements, as described above.

Process 1400 may include additional aspects, such as any single aspect or any combination of aspects described below and/or in connection with one or more other processes described elsewhere herein.

In a first aspect, the one or more UE-to-UE CLI measurement resources include one or more CLI-RSSI measurement resources or one or more SRS-RSRP measurement resources.

In a second aspect, alone or in combination with the first aspect, the one or more symbols include one or more SBFD symbols, and the UE-to-UE CLI measurement resources are within at least one downlink sub-band of the one or more SBFD symbols.

In a third aspect, alone or in combination with one or more of the first and second aspects, downlinking communications are not muted in two consecutive symbols that immediately precede the one or more symbols.

In a fourth aspect, alone or in combination with one or more of the first through third aspects, process 1400 includes receiving, from the UE, UE capability information indicating whether the UE supports frequency division multiplexing of UE-to-UE CLI measurement resources and downlink communications.

In a fifth aspect, alone or in combination with one or more of the first through fourth aspects, process 1400 includes transmitting a downlink communication in the one or more other symbols that immediately precede the one or more symbols.

In a sixth aspect, alone or in combination with one or more of the first through fifth aspects, uplink communications are not restricted in the one or more other symbols that immediately precede the one or more symbols.

In a seventh aspect, alone or in combination with one or more of the first through sixth aspects, process 1400 includes receiving an uplink communication in the one or more other symbols that immediately precede the one or more symbols.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
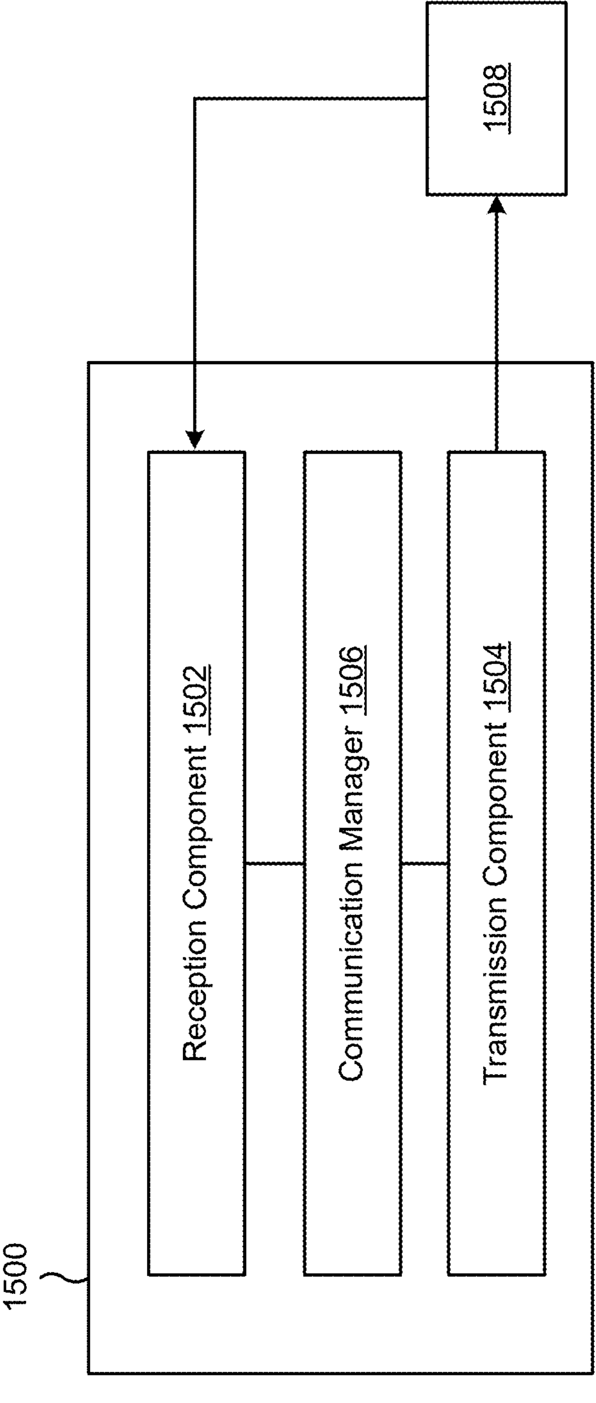
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a UE, or a UE may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 140 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 8, 9A-9B, and 10. Additionally, or alternatively, the apparatus 1500 may be configured to perform one or more processes described herein, such as process 1100 of FIG. 11, process 1300 of FIG. 13, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1504 may be co-located with the reception component 1502 in one or more transceivers.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

In some aspects, the reception component 1502 may receive, from a network node, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The communication manager 1506 may perform one or more UE-to-UE CLI measurements in the one or more UE-to-UE CLI measurement resources. The transmission component 1504 may transmit, to the network node, a measurement report including results of the one or more UE-to-UE CLI measurements.

The communication manager 1506 may perform rate-matching around the one or more UE-to-UE CLI measurement resources for at least one downlink communication received in the at least one downlink sub-band in the one or more SBFD symbols in accordance with the RE-level or RB-level downlink muting pattern.

The reception component 1502 may receive dynamic signaling activating the semi-persistent downlink muting pattern.

The reception component 1502 may receive dynamic signaling triggering the dynamic downlink muting pattern.

The transmission component 1504 may transmit, to the network node, UE capability information indicating a UE capability to support RE-level or RB-level UE-to-UE CLI measurement resource rate matching for PDSCH communications.

The reception component 1502 may receive dynamic signaling to enable or disable rate matching in accordance with the downlink muting pattern.

In some aspects, the reception component 1502 may receive, from a network node, configuration information indicating one or more UE-to-UE CLI measurement resources in one or more symbols. The communication manager 1506 may perform one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols. The transmission component 1504 may transmit, to the network node, a measurement report including results of the one or more UE-to-UE CLI measurements.

The transmission component 1504 may transmit, to the network node, UE capability information indicating whether the UE supports frequency division multiplexing of UE-to-UE CLI measurement resources and downlink communications.

The reception component 1502 may receive a downlink communication in the one or more other symbols that immediately precede the one or more symbols.

The transmission component 1504 may transmit an uplink communication in the one or more other symbols that immediately precede the one or more symbols.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
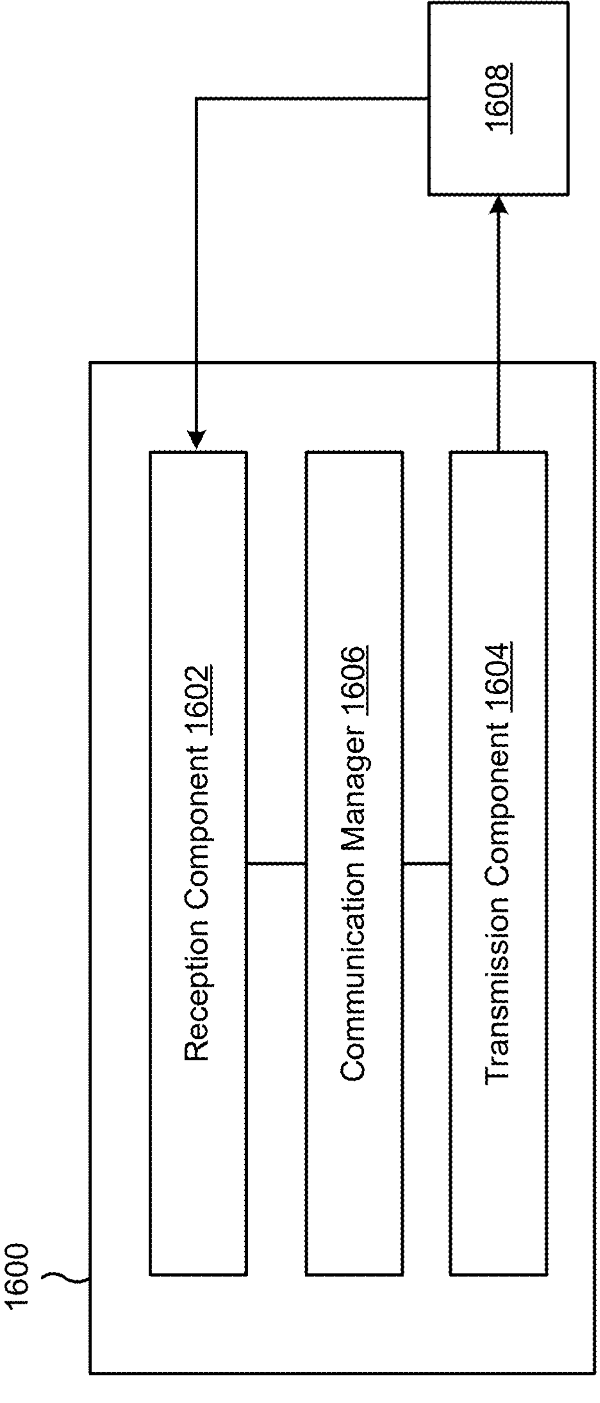
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network node, or a network node may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the communication manager 150 described in connection with FIG. 1. As shown, the apparatus 1600 may communicate with another apparatus 1608, such as a UE or a network node (such as a CU, a DU, an RU, or a base station), using the reception component 1602 and the transmission component 1604.

In some aspects, the apparatus 1600 may be configured to perform one or more operations described herein in connection with FIGS. 8, 9A-9B, and 10. Additionally, or alternatively, the apparatus 1600 may be configured to perform one or more processes described herein, such as process 1200 of FIG. 12, process 1400 of FIG. 14, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1602 and/or the transmission component 1604 may include or may be included in a network interface. The network interface may be configured to obtain and/or output signals for the apparatus 1600 via one or more communications links, such as a backhaul link, a midhaul link, and/or a fronthaul link.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1604 may be co-located with the reception component 1602 in one or more transceivers.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

In some aspects, the transmission component 1604 may transmit, to a UE, configuration information indicating one or more UE-to-UE CLI measurement resources, within at least one downlink sub-band in one or more SBFD symbols, and indicating an RE-level or RB-level downlink muting pattern associated with the one or more UE-to-UE CLI measurement resources. The reception component 1602 may receive, from the UE, a measurement report including results of one or more UE-to-UE CLI measurements associated with the one or more UE-to-UE CLI measurement resources.

The communication manager 1606 may refrain from transmitting downlink communications in frequency resources of the one or more CLI measurement resources in accordance with the downlink muting pattern.

The transmission component 1604 may transmit dynamic signaling activating the semi-persistent downlink muting pattern.

The transmission component 1604 may transmit dynamic signaling triggering the dynamic downlink muting pattern.

The reception component 1602 may receive, from the UE, UE capability information indicating a UE capability to support RE-level or RB-level UE-to-UE CLI measurement resource rate matching for PDSCH communications.

The transmission component 1604 may transmit dynamic signaling to enable or disable rate matching in accordance with the downlink muting pattern.

The transmission component 1604 may transmit, to another network node, an indication of the downlink muting pattern.

The reception component 1602 may receive, from another network node, an indication of another downlink muting pattern associated with one or more neighboring cell UE-to-UE CLI measurements.

In some aspects, the transmission component 1604 may transmit, to a UE, configuration information indicating one or more UE-to-UE CLI measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols. The reception component 1602 may receive, from the UE, a measurement report including results of the one or more UE-to-UE CLI measurements.

The reception component 1602 may receive, from the UE, UE capability information indicating whether the UE supports frequency division multiplexing of UE-to-UE CLI measurement resources and downlink communications.

The transmission component 1604 may transmit a downlink communication in the one or more other symbols that immediately precede the one or more symbols.

The reception component 1602 may receive an uplink communication in the one or more other symbols that immediately precede the one or more symbols.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving, from a network node, configuration information indicating one or more UE-to-UE cross link interference (CLI) measurement resources, within at least one downlink sub-band in one or more sub-band full-duplex (SBFD) symbols, and indicating a resource element (RE)-level or resource block (RB)-level downlink muting pattern associated with the one or more UE-to-UE CLI measurement resources; performing one or more UE-to-UE CLI measurements in the one or more UE-to-UE CLI measurement resources; and transmitting, to the network node, a measurement report including results of the one or more UE-to-UE CLI measurements.

Aspect 2: The method of Aspect 1, further comprising: performing rate-matching around the one or more UE-to-UE CLI measurement resources for at least one downlink communication received in the at least one downlink sub-band in the one or more SBFD symbols in accordance with the RE-level or RB-level downlink muting pattern.

Aspect 3: The method of any of Aspects 1-2, wherein downlink timing is used for the one or more UE-to-UE CLI measurements, and wherein downlink communications are not muted in one or more other symbols that immediately precede the one or more SBFD symbols.

Aspect 4: The method of any of Aspects 1-3, wherein the downlink muting pattern is a periodic downlink muting pattern.

Aspect 5: The method of any of Aspects 1-3, wherein the downlink muting pattern is a semi-persistent downlink muting pattern.

Aspect 6: The method of Aspect 5, further comprising: receiving dynamic signaling activating the semi-persistent downlink muting pattern.

Aspect 7: The method of any of Aspects 1-3, wherein the downlink muting pattern is a dynamic downlink muting pattern.

Aspect 8: The method of Aspect 7, further comprising: receiving dynamic signaling triggering the dynamic downlink muting pattern.

Aspect 9: The method of any of Aspects 1-8, wherein the one or more UE-to-UE CLI measurement resources include a pattern of non-contiguous REs or non-contiguous RBs.

Aspect 10: The method of Aspect 9, wherein frequency resources of the one or more UE-to-UE CLI measurement resources are not available for physical downlink shared channel (PDSCH) reception.

Aspect 11: The method of any of Aspects 1-8, wherein the one or more UE-to-UE CLI measurement resources include one or more contiguous physical resource blocks (PRBs).

Aspect 12: The method of any of Aspects 1-11, further comprising: transmitting, to the network node, UE capability information indicating a UE capability to support RE-level or RB-level UE-to-UE CLI measurement resource rate matching for physical downlink shared channel (PDSCH) communications.

Aspect 13: The method of any of Aspects 1-12, wherein the configuration information includes an explicit configuration of the downlink muting pattern.

Aspect 14: The method of any of Aspects 1-12, wherein the configuration information includes a configuration of frequency resources for the one or more UE-to-UE CLI measurement resources, and wherein the configuration of the frequency resources for the one or more UE-to-UE CLI measurement resources indicates the downlink muting pattern.

Aspect 15: The method of any of Aspects 1-14, further comprising: receiving dynamic signaling to enable or disable rate matching in accordance with the downlink muting pattern.

Aspect 16: The method of any of Aspects 1-15, wherein frequency resources of the one or more UE-to-UE CLI measurement resources are not available for physical downlink shared channel (PDSCH) reception by the UE in the one or more SBFD symbols.

Aspect 17: The method of any of Aspects 1-16, wherein the configuration information indicates another downlink muting pattern associated with one or more neighboring cell UE-to-UE CLI measurements.

Aspect 18: The method of any of Aspects 1-17, wherein the one or more UE-to-UE CLI measurement resources include one or more CLI received signal strength indicator (CLI-RSSI) measurement resources or one or more sounding reference signal (SRS) reference signal received power (SRS-RSRP) measurement resources.

Aspect 19: A method of wireless communication performed by a network node, comprising: transmitting, to a user equipment (UE), configuration information indicating one or more UE-to-UE cross link interference (CLI) measurement resources, within at least one downlink sub-band in one or more sub-band full-duplex (SBFD) symbols, and indicating a resource element (RE)-level or resource block (RB)-level downlink muting pattern associated with the one or more UE-to-UE CLI measurement resources; and receiving, from the UE, a measurement report including results of one or more UE-to-UE CLI measurements associated with the one or more UE-to-UE CLI measurement resources.

Aspect 20: The method of Aspect 19, further comprising: refraining from transmitting downlink communications in frequency resources of the one or more CLI measurement resources in accordance with the downlink muting pattern.

Aspect 21: The method of any of Aspects 19-20, wherein downlink timing is used for the one or more UE-to-UE CLI measurements, and wherein downlink communications are not muted in one or more other symbols that immediately precede the one or more SBFD symbols.

Aspect 22: The method of any of Aspects 19-21, wherein the downlink muting pattern is a periodic downlink muting pattern.

Aspect 23: The method of any of Aspects 19-21, wherein the downlink muting pattern is a semi-persistent downlink muting pattern.

Aspect 24: The method of Aspect 23, further comprising: transmitting dynamic signaling activating the semi-persistent downlink muting pattern.

Aspect 25: The method of any of Aspects 19-21, wherein the downlink muting pattern is a dynamic downlink muting pattern.

Aspect 26: The method of Aspect 25, further comprising: transmitting dynamic signaling triggering the dynamic downlink muting pattern.

Aspect 27: The method of any of Aspects 19-26, wherein the one or more UE-to-UE CLI measurement resources include a pattern of non-contiguous REs or non-contiguous RBs.

Aspect 28: The method of Aspect 27, wherein frequency resources of the one or more UE-to-UE CLI measurement resources are not available for physical downlink shared channel (PDSCH) transmission.

Aspect 29: The method of any of Aspects 19-26, wherein the one or more UE-to-UE CLI measurement resources include one or more contiguous physical resource blocks (PRBs).

Aspect 30: The method of any of Aspects 19-29, further comprising: receiving, from the UE, UE capability information indicating a UE capability to support RE-level or RB-level UE-to-UE CLI measurement resource rate matching for physical downlink shared channel (PDSCH) communications.

Aspect 31: The method of any of Aspects 19-30, wherein the configuration information includes an explicit configuration of the downlink muting pattern.

Aspect 32: The method of any of Aspects 19-30, wherein the configuration information includes a configuration of frequency resources for the one or more UE-to-UE CLI measurement resources, and wherein the configuration of the frequency resources for the one or more UE-to-UE CLI measurement resources indicates the downlink muting pattern.

Aspect 33: The method of any of Aspects 19-32, further comprising: transmitting dynamic signaling to enable or disable rate matching in accordance with the downlink muting pattern.

Aspect 34: The method of any of Aspects 19-33, wherein frequency resources of the one or more UE-to-UE CLI measurement resources are not available for physical downlink shared channel (PDSCH) transmission by the network node in the one or more SBFD symbols.

Aspect 35: The method of any of Aspects 19-34, wherein the one or more UE-to-UE CLI measurement resources include one or more CLI received signal strength indicator (CLI-RSSI) measurement resources or one or more sounding reference signal (SRS) reference signal received power (SRS-RSRP) measurement resources.

Aspect 36: The method of any of Aspects 19-35, further comprising: transmitting, to another network node, an indication of the downlink muting pattern.

Aspect 37: The method of Aspect 36, wherein the downlink muting pattern is a periodic downlink muting pattern.

Aspect 38: The method of any of Aspects 36-37, wherein the downlink muting pattern is an RE-level downlink muting pattern.

Aspect 39: The method of any of Aspects 36-38, wherein the downlink muting pattern includes one or more contiguous RBs.

Aspect 40: The method of any of Aspects 36-38, wherein the downlink muting pattern is a pattern of non-contiguous REs or non-contiguous RBs.

Aspect 41: The method of any of Aspects 19-40, further comprising: receiving, from another network node, an indication of another downlink muting pattern associated with one or more neighboring cell UE-to-UE CLI measurements.

Aspect 42: The method of Aspect 41, wherein the configuration information indicates the other downlink muting pattern associated with the one or more neighboring cell UE-to-UE CLI measurements.

Aspect 43: The method of any of Aspects 41-42, wherein the other downlink muting pattern is a periodic downlink muting pattern.

Aspect 44: The method of any of Aspects 41-43, wherein the other downlink muting pattern is an RE-level downlink muting pattern.

Aspect 45: The method of any of Aspects 41-44, wherein the other downlink muting pattern includes one or more contiguous RBs.

Aspect 46: The method of any of Aspects 41-44, wherein the other downlink muting pattern is a pattern of non-contiguous REs or non-contiguous RBs.

Aspect 47: A method of wireless communication performed by a user equipment (UE), comprising: receiving, from a network node, configuration information indicating one or more UE-to-UE cross link interference (CLI) measurement resources in one or more symbols; performing one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols; and transmitting, to the network node, a measurement report including results of the one or more UE-to-UE CLI measurements.

Aspect 48: The method of Aspect 47, wherein the one or more UE-to-UE CLI measurement resources include one or more CLI received signal strength indicator (CLI-RSSI) measurement resources or one or more sounding reference signal (SRS) reference signal received power (SRS-RSRP) measurement resources.

Aspect 49: The method of any of Aspects 47-48, wherein the one or more symbols include one or more sub-band full-duplex (SBFD) symbols, and wherein the UE-to-UE CLI measurement resources are within at least one downlink sub-band of the one or more SBFD symbols.

Aspect 50: The method of any of Aspects 47-49, wherein downlink communications are not muted in two consecutive symbols that immediately precede the one or more symbols.

Aspect 51: The method of any of Aspects 47-50, further comprising: transmitting, to the network node, UE capability information indicating whether the UE supports frequency division multiplexing of UE-to-UE CLI measurement resources and downlink communications.

Aspect 52: The method of any of Aspects 47-51, further comprising: receiving a downlink communication in the one or more other symbols that immediately precede the one or more symbols.

Aspect 53: The method of any of Aspects 47-52, wherein uplink communications are not restricted in the one or more other symbols that immediately precede the one or more symbols.

Aspect 54: The method of Aspect 53, further comprising: transmitting an uplink communication in the one or more other symbols that immediately precede the one or more symbols.

Aspect 55: A method of wireless communication performed by a network node, comprising: transmitting, to a user equipment (UE), configuration information indicating one or more UE-to-UE cross link interference (CLI) measurement resources in one or more symbols, wherein downlink timing is used for one or more UE-to-UE CLI measurements in the one or more UE-to-UE CLI measurement resources, and wherein downlink communications are not muted in one or more other symbols that immediately precede the one or more symbols; and receiving, from the UE, a measurement report including results of the one or more UE-to-UE CLI measurements.

Aspect 56: The method of Aspect 55, wherein the one or more UE-to-UE CLI measurement resources include one or more CLI received signal strength indicator (CLI-RSSI) measurement resources or one or more sounding reference signal (SRS) reference signal received power (SRS-RSRP) measurement resources.

Aspect 57: The method of any of Aspects 55-56, wherein the one or more symbols include one or more sub-band full-duplex (SBFD) symbols, and wherein the UE-to-UE CLI measurement resources are within at least one downlink sub-band of the one or more SBFD symbols.

Aspect 58: The method of any of Aspects 55-57, wherein downlink communications are not muted in two consecutive symbols that immediately precede the one or more symbols.

Aspect 59: The method of any of Aspects 55-58, further comprising: receiving, from the UE, UE capability information indicating whether the UE supports frequency division multiplexing of UE-to-UE CLI measurement resources and downlink communications.

Aspect 60: The method of any of Aspects 55-59, further comprising: transmitting a downlink communication in the one or more other symbols that immediately precede the one or more symbols.

Aspect 61: The method of any of Aspects 55-60, wherein uplink communications are not restricted in the one or more other symbols that immediately precede the one or more symbols.

Aspect 62: The method of Aspect 61, further comprising: receiving an uplink communication in the one or more other symbols that immediately precede the one or more symbols.

Aspect 63: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-62.

Aspect 64: An apparatus for wireless communication at a device, the apparatus comprising one or more memories and one or more processors coupled to the one or more memories, the one or more processors configured to cause the device to perform the method of one or more of Aspects 1-62.

Aspect 65: An apparatus for wireless communication, the apparatus comprising at least one means for performing the method of one or more of Aspects 1-62.

Aspect 66: A non-transitory computer-readable medium storing code for wireless communication, the code comprising instructions executable by one or more processors to perform the method of one or more of Aspects 1-62.

Aspect 67: A non-transitory computer-readable medium storing a set of instructions for wireless communication, the set of instructions comprising one or more instructions that, when executed by one or more processors of a device, cause the device to perform the method of one or more of Aspects 1-62.

Aspect 68: A device for wireless communication, the device comprising a processing system that includes one or more processors and one or more memories coupled with the one or more processors, the processing system configured to cause the device to perform the method of one or more of Aspects 1-62.

Aspect 69: An apparatus for wireless communication at a device, the apparatus comprising one or more memories and one or more processors coupled to the one or more memories, the one or more processors individually or collectively configured to cause the device to perform the method of one or more of Aspects 1-62.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

one or more memories; and one or more processors, coupled to the one or more memories, configured to cause the UE to:

receive, from a network node, configuration information indicating one or more UE-to-UE cross link interference (CLI) measurement resources, within at least one downlink sub-band in one or more sub-band full-duplex (SBFD) symbols, and indicating a resource element (RE)-level or resource block (RB)- level downlink muting pattern associated with the one or more UE-to-UE CLI measurement resources;

perform one or more UE-to-UE CLI measurements in the one or more UE-to-UE CLI measurement resources; and transmit, to the network node, a measurement report including results of the one or more UE-to-UE CLI measurements.

2. The UE of claim 1, wherein the one or more processors are further configured to cause the UE to:

perform rate-matching around the one or more UE-to-UE CLI measurement resources for at least one downlink communication received in the at least one downlink sub-band in the one or more SBFD symbols in accordance with the RE-level or RB-level downlink muting pattern.

3. The UE of claim 1, wherein downlink timing is used for the one or more UE-to-UE CLI measurements, and wherein downlink communications are not muted in one or more other symbols that immediately precede the one or more SBFD symbols.

4. The UE of claim 1, wherein the downlink muting pattern is a periodic downlink muting pattern, a semi-persistent downlink muting pattern, or a dynamic downlink muting pattern.

5. The UE of claim 1, wherein the one or more UE-to-UE CLI measurement resources include a pattern of non-contiguous REs or non-contiguous RBs.

6. The UE of claim 1, wherein the one or more UE-to-UE CLI measurement resources include one or more contiguous physical resource blocks (PRBs).

7. The UE of claim 1, wherein the one or more processors are further configured to cause the UE to:

transmit, to the network node, UE capability information indicating a UE capability to support RE-level or RB-level UE-to-UE CLI measurement resource rate matching for physical downlink shared channel (PDSCH) communications.

8. The UE of claim 1, wherein the one or more processors are further configured to cause the UE to:

receive dynamic signaling to enable or disable rate matching in accordance with the downlink muting pattern.

9. The UE of claim 1, wherein frequency resources of the one or more UE-to-UE CLI measurement resources are not available for physical downlink shared channel (PDSCH) reception by the UE in the one or more SBFD symbols.

10. The UE of claim 1, wherein the configuration information indicates another downlink muting pattern associated with one or more neighboring cell UE-to-UE CLI measurements.

11. The UE of claim 1, wherein the one or more UE-to-UE CLI measurement resources include one or more CLI received signal strength indicator (CLI-RSSI) measurement resources or one or more sounding reference signal (SRS) reference signal received power (SRS-RSRP) measurement resources.

12. A network node for wireless communication, comprising:

one or more memories; and one or more processors, coupled to the one or more memories, configured to cause the network node to:

transmit, to a user equipment (UE), configuration information indicating one or more UE-to-UE cross link interference (CLI) measurement resources, within at least one downlink sub-band in one or more sub-band full-duplex (SBFD) symbols, and indicating a resource element (RE)-level or resource block (RB)-level downlink muting pattern associated with the one or more UE-to-UE CLI measurement resources; and receive, from the UE, a measurement report including results of one or more UE-to-UE CLI measurements associated with the one or more UE-to-UE CLI measurement resources.

13. The network node of claim 12, wherein the one or more processors are further configured to cause the network node to:

refrain from transmitting downlink communications in frequency resources of the one or more CLI measurement resources in accordance with the downlink muting pattern.

14. The network node of claim 12, wherein the one or more processors are further configured to cause the network node to:

transmit, to another network node, an indication of the downlink muting pattern.

15. The network node of claim 14, wherein at least one of:

the downlink muting pattern is a periodic downlink muting pattern, the downlink muting pattern is an RE-level downlink muting pattern, downlink muting pattern includes one or more contiguous RBs, or the downlink muting pattern is a pattern of non-contiguous REs or non-contiguous RBs.

16. The network node of claim 12, wherein the one or more processors are further configured to cause the network node to:

receive, from another network node, an indication of another downlink muting pattern associated with one or more neighboring cell UE-to-UE CLI measurements.

17. A UE for wireless communication, comprising:

one or more memories; and one or more processors, coupled to the one or more memories, configured to cause the UE to:

receive, from a network node, configuration information indicating one or more UE-to-UE cross link interference (CLI) measurement resources in one or more symbols;

perform one or more UE-to-UE CLI measurements in the one or more UE-to-UE CLI measurement resources, wherein downlink timing is used for the one or more UE-to-UE CLI measurements, and wherein downlink communications are not muted in one or more other symbols that immediately precede the one or more symbols; and transmit, to the network node, a measurement report including results of the one or more UE-to-UE CLI measurements.

18. The UE of claim 17, wherein the one or more UE-to-UE CLI measurement resources include one or more CLI received signal strength indicator (CLI-RSSI) measurement resources or one or more sounding reference signal (SRS) reference signal received power (SRS-RSRP) measurement resources.

19. The UE of claim 17, wherein the one or more symbols include one or more sub-band full-duplex (SBFD) symbols, and wherein the UE-to-UE CLI measurement resources are within at least one downlink sub-band of the one or more SBFD symbols.

20. The UE of claim 17, wherein uplink communications are not restricted in the one or more other symbols that immediately precede the one or more symbols.

* * * * *